United States Patent [19]
Kondoh et al.

[11] Patent Number: 5,374,880
[45] Date of Patent: Dec. 20, 1994

[54] MOTOR DRIVING CIRCUIT

[75] Inventors: Shunichi Kondoh, Itami; Satoshi Kusaka, Amagasaki, both of Japan

[73] Assignees: Mitsubishi Electric Engineering Company Limited; Mitsubishi Denki Kabushiki Kaisha, both of Tokyo, Japan

[21] Appl. No.: 223,220

[22] Filed: Apr. 5, 1994

[30] Foreign Application Priority Data

Apr. 12, 1993 [JP] Japan ................................. 5-084530

[51] Int. Cl.5 ............................................. H02P 6/02
[52] U.S. Cl. ................................... 318/254; 318/138; 318/439
[58] Field of Search ................ 318/138, 254, 700–832, 318/439

[56] References Cited

U.S. PATENT DOCUMENTS

| | | | |
|---|---|---|---|
| 4,641,066 | 2/1987 | Nagata et al. | 318/254 |
| 5,012,167 | 4/1991 | Hendricks | 318/254 |
| 5,319,290 | 6/1994 | Yoshino et al. | 318/254 |

FOREIGN PATENT DOCUMENTS 251389 2/1990 Japan .

*Primary Examiner*—Paul Ip
*Attorney, Agent, or Firm*—Oblon, Spivak, McClelland, Maier & Neustadt

[57] ABSTRACT

It is an object to enable efficient driving even if the rotation speed is variable in a driving circuit for a DC brushless motor having no position detection. The counterelectromotive force of the motor M is received by the comparators (201–203) and the trigger signals (G1 and G2) are outputted with 120° cycle in synchronization with the rotation. Two oscillation signals (N1 and N2) in synchronization with the rotation of the motor are generated therefrom and a serial control signal (CNT) which becomes active/inactive for every 30° is further produced in the 30° signal operation circuit (104). The control signal (CNT) is serial/parallel converted into conversion control signals (L1–L3) in the 180° signal conversion circuit (105). The 120° switching circuit (116) further converts them into driving signals (K1–K6) and applies them to the current control portion (300). The motor is driven by a signal delayed by a rotation angle of 30° not according to the number of rotation of the motor.

18 Claims, 18 Drawing Sheets

MOTOR DRIVING CIRCUIT

BACKGROUND OF THE INVENTION

1. Field of the Invention

The present invention relates to motor driving circuits, and particularly to a DC brushless motor having no position detecting mechanism separately provided.

2. Description of the Background Art

FIG. 21 is a circuit diagram of a driving circuit for driving a DC brushless motor having no position detecting mechanism provided. A motor M includes coils 51–53 connected in common to a middle point connected to a terminal 8A. These coils 51–53 are connected to a current control portion 300 through terminals 5A–7A. Transistors 1–6 included in the current control portion 300 are controlled by a 120° switching circuit 109 to turn off and on, and the motor M receives three-phase current to operate.

The 120° switching circuit 109 is controlled by a start circuit 110 and the motor M is activated. The frequency of a signal provided to the 120° switching circuit 109 from the start circuit 110 is determined in capacitors 34 and 35.

The timing of applying an electric current to the coils 51–53 of the motor M is switched by the control of the 120° switching circuit 109. A position detecting portion 200 provides position detection signals D1–D3 to the 120° switching circuit 109. In a DC brushless motor which has no position detection mechanism, the counterelectromotive force of the motor is used for position detection to continuously run the motor M. Accordingly, the counterelectromotive force of the motor M is inputted to the position detection portion 200 through terminals 1A–4A. That is, the terminals 1A–4A and the terminals 5A–8A are connected to one another. In the position detection portion 200, comparators 201–203 compare potential at the middle point and potential at each of the terminals 5A–7A to output the position detection signals D1–D3, respectively.

FIG. 22 is a timing chart showing driving of the motor M. Now, if considering the case in which there is no filter formed of a capacitor 36 and a resistance 39 at an input end of the comparator 201, a voltage R1 at the coil 51 varies as shown by the broken line in FIG. 22. The position detection signal D1 detects a zero-cross point of the voltage R1 and presents the waveform illustrated by the broken line. Similarly, at input ends of the comparators 202 and 203, assuming that there is no filter, the position detection signals D2 and D3 present the waveforms shown by the broken lines. The 120° switching circuit 109 synthesizes these signals D1–D3 to output a driving signal K1 (the broken line) for controlling the transistor 1 in the current control portion 300.

To rotate the motor M efficiently, however, the period in which the driving signal K1 for driving the transistor 1 is activated must be delayed by 30°. Accordingly, filters including capacitor 36 and a resistor 39, a capacitor 37 and a resistor 40, and a capacitor 38 and a resistor 41, respectively, are provided at input ends of the comparators 201–203. These filters are designed so that the waveforms of the position detection signals D1–D3 are delayed by 30° (the solid lines) as compared with those in the case in which there is no filters provided (the broken lines).

Receiving the position detection signals D1–D3 shown by the solid lines which are obtained in this way, the 120° switching circuit 109 outputs the driving signal K1 shown by the solid line to drive the transistor 1. Similarly, the switching circuit 109 outputs driving signals for driving the transistors 2–6. As a result, the voltage R1 presents the waveform shown by the solid line.

In the conventional driving circuit for driving the DC brushless motor having no position detection mechanism, the driving signal for driving the motor is delayed by 30° by means of a filter including the CR. Accordingly, it can run the motor efficiently only at a particular number of rotation, but it has a problem that it can not enable efficient operation at other rotation numbers.

SUMMARY OF THE INVENTION

The present invention is directed to a motor driving circuit for controlling a motor of three-phase having a middle point and first to third input ends. In the present invention, the angle all means the angle of rotation.

According to the first aspect of the present invention, a motor driving circuit for controlling a three-phase motor having a middle point and first to third input ends, comprises (a) a current control portion having (a-1) first to third input ends, and (a-2) first to third output ends for supplying first to third driving currents to the first to third input ends of the motor, respectively, (b) a detection portion having (b-1) first to third input ends connected to the first to third input ends of the motor, (b-2) a fourth input end connected to the middle point, and (b-3) an i-th output end for detecting an i-th voltage occurring between the first to third input end of the motor and the middle point to output an i-th detection signal, (c) a control signal generation portion having (c-1) first to third input ends for inputting the first to third detection signals, and (c-2) an output end for outputting a control signal which are serially outputted while being repeatedly activated/inactivated for every 30° in synchronization with the first to third detection signals, and (d) a driving signal generation portion having (d-1) an input end connected to the output end of the control signal generation portion, and (d-2) first to third output ends connected to the first to third input ends of the current control portion, respectively, for outputting first to third driving signals having duty of ⅓ and maintaining a phase difference of 120° to one another, respectively.

Preferably, the driving signal generation portion includes (d-3) a first control signal conversion portion having (d-3-1) an input end for inputting the control signal, and (d-3-2) first to third output ends for outputting first to third conversion control signals having duty of ½ and maintaining a phase difference of 120° with one another in synchronization with the control signal, and (d-4) a second control signal conversion portion having (d-4-1) first to third input ends for inputting the first to third conversion control signals, and (d-4-2) first to third output ends from which the first to third driving signals are outputted.

Preferably, according to the second aspect of the present invention, the first to third conversion control signals and the first to third driving signals transit among a plurality of logic values, and the transition of the values of the first to third conversion control signals is sharper than the transition of the first to third driving signals.

Preferably, the control signal generation portion includes, (c-3) a trigger output circuit having (c-3-1) first to third input ends to which the first to third detection signals are provided, (c-3-2) a first output end to which a first trigger signal which is activated for every 120° in synchronization with the first to third detection signals is provided, and (c-3-3) a second output end to which a second trigger signal which is activated maintaining a phase difference of 60° with the first trigger signal is provided, (c-4) an oscillation signal generation portion having (c-4-1) first and second trigger input ends to which the first and second trigger signals are respectively provided, and (c-4-2) first and second output ends from which first and second oscillation signals are respectively outputted which are continuously activated in a period of 30° for every 120° and, when each of the first and second trigger signals is activated, activated respectively in synchronization with the same, and (c-5) an operation circuit having (c-5-1) first and second input ends to which the first and second oscillation signals are provided, and (c-5-2) an output end for outputting the control signal in synchronization with the first and second oscillation signals.

Preferably, according to the third aspect of the present invention, the trigger output circuit further includes (c-3-4) cut-off means for performing signal cut-off control in which the first trigger signal is activated only when the second oscillation signal is inactive and the second trigger signal is activated only when the first oscillation signal is inactive.

Preferably, according to the fourth aspect of the present invention, the motor driving circuit according to the first aspect further includes (e) a third oscillation circuit for outputting a start signal which is serially outputted being repeatedly activated/inactivated for every 30°, (f) a switch having (f-1) a first input end connected to the output end of the control signal generation portion, (f-2) a second input end to which the start signal is inputted, and (f-3) an output end electrically connected only to one of the first and second input ends of itself, and (g) oscillation control means performing switching of the switch and control of frequency of the start signal.

According to the first aspect of the present invention, the control signal is a serial signal which repeats activation/inactivation for every 30° in synchronization with the rotation of the motor. Then, the control signal is serial/parallel converted to generate a driving signal. The driving signal can efficiently apply electric current by shifting the timing of application of the electric current to the coil of the motor by 30°.

The current is applied to the motor in synchronization with the angle of rotation of the motor, so that the motor can be efficiently driven independently of the number of rotation of the motor.

According to the second aspect of the present invention, the second control signal conversion portion performs so-called soft-switching.

The switching of the current applied to the motor is performed softly, so that occurrence of radical counter-electromotive force in the motor can be avoided.

According to the third aspect of the present invention, the cut-off means limits the activation of the first and second trigger signals to a particular period.

The period in which the trigger signal provided to the first and second oscillation circuits is activated is limited, so that malfunctions of internal starting can be avoided.

According to the fourth aspect of the present invention, the start signal which is a serial signal having frequency appropriate to start of the motor is provided to the driving signal generation portion in place of the control signal when the motor starts rotating.

A serial signal is separately applied from the outside at the beginning of starting the motor, the motor is started at frequency sufficiently low for the motor to start rotating and drive similarly to the first aspect after the motor attains a certain rotation number, so that the starting defective can be avoided.

Accordingly, it is an object of the present invention to obtain a driving circuit which can drive a motor efficiently independently of the number of rotation of the motor.

These and other objects, features, aspects and advantages of the present invention will become more apparent from the following detailed description of the present invention when taken in conjunction with the accompanying drawings.

DESCRIPTION OF THE PREFERRED EMBODIMENTS

A. The First Preferred Embodiment

Figure 1:
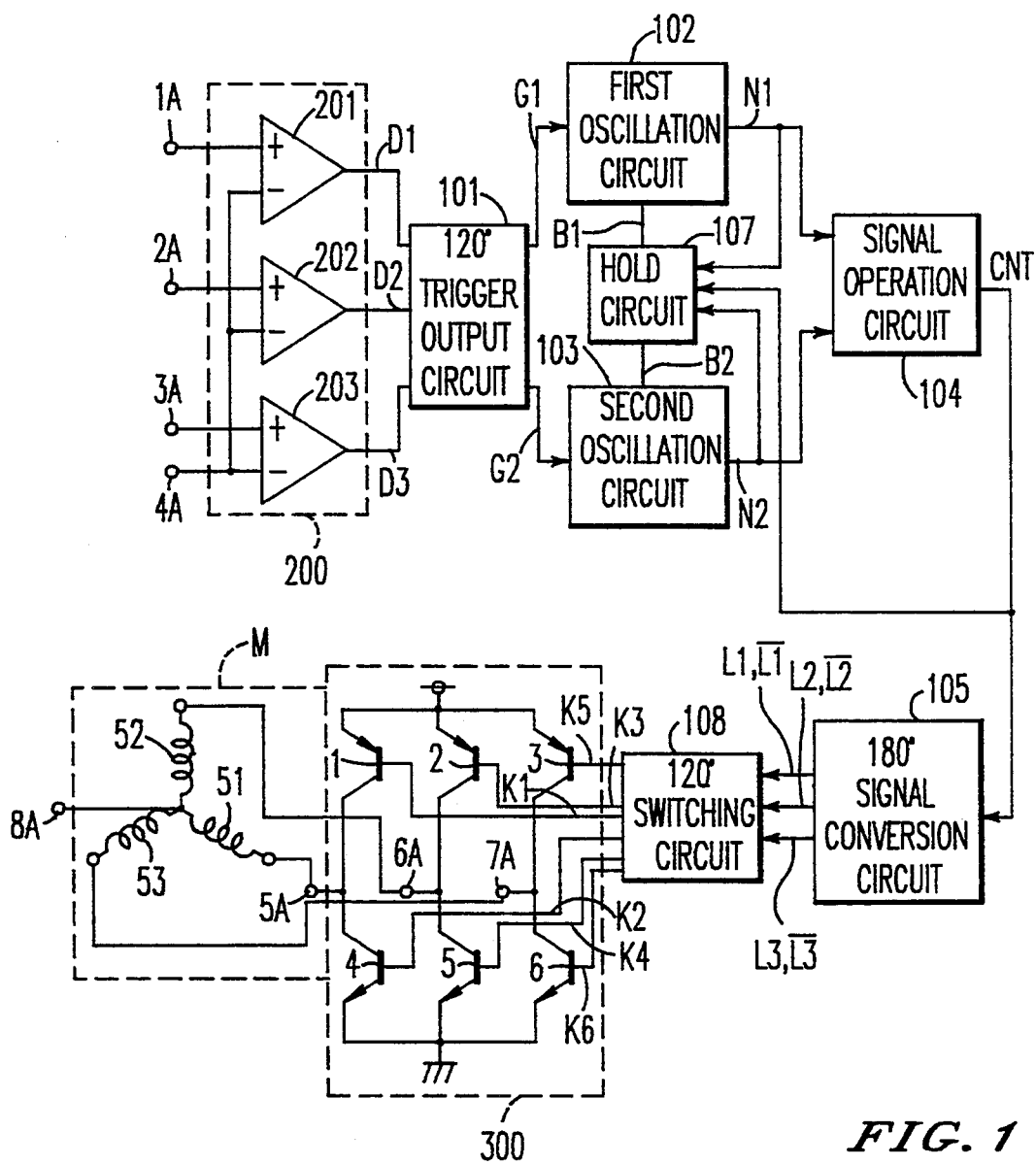
FIGS. 1 and 2 are circuit diagrams illustrating the first preferred embodiment of the present invention.

FIG. 1 is a circuit diagram of a DC brushless motor driving circuit according to the first preferred embodiment of the present invention. A middle point of a motor M is connected to a terminal 8A and one ends of coils 51–53 are also connected to the same in common. The other ends of the coils 51–53 are connected to terminals 5A–7A, respectively.

A current control portion 300 is connected to the motor M, and a 108° signal conversion circuit 105 is connected to the current control portion 300 through a 120° signal switching circuit 108. The 180° signal conversion circuit 105 is supplied with a control signal CNT. The control signal CNT is outputted from a 30° signal operation circuit 104.

The terminals 5A–8A are connected to terminals 1A–4A respectively, through which a position detection portion 200 is connected to the motor M. Those connections are omitted in FIG. 1 for simplicity. A 120° trigger output circuit 101 is connected to the position detection portion 200, and a first oscillation circuit 102 and a second oscillation circuit 103 are connected between the 120° trigger output circuit 101 and the 30° signal operation circuit 104. A hold circuit 107 is connected to the 30° signal operation circuit 104, the first oscillation circuit 102 and the second oscillation circuit 103.

The current control portion 300 includes transistors 1–6, where collectors of the transistors 1 and 4 are connected to the terminal 5A, collectors of the transistors 2 and 5 are connected to the terminal 6A, and collectors for the transistors 3 and 6 are connected to the terminal 7A, respectively. The transistors 1–3 are of the PNP type, and high potential is applied to emitters thereof in common. The transistors 4–6 are of the NPN type, and low potential is applied to emitters thereof. Driving signals K1, K2, K3, K4, K5, K6 are provided to bases of the transistors 1, 4, 2, 5, 3, 6 from the 120° switching circuit 108, respectively.

The position detection portion 200 includes comparators 201–203. The filter provided at the input end thereof in the conventional art is not provided in the present invention. Non-inversion input ends of the comparators 201–203 are connected to the terminals 1A–3A, respectively, and inversion input ends of the comparators 201–203 are connected to the terminal 4A in common. Position detection signals D1–D3 are outputted from output ends of the comparators 201–203, respectively.

The 120° trigger output circuit 101 receives the position detection signals D1–D3 to output first and second trigger signals G1 and G2. They are pulse signals which are activated with a cycle of 120°, which maintain the angle difference of 60° to each other.

Figure 2:
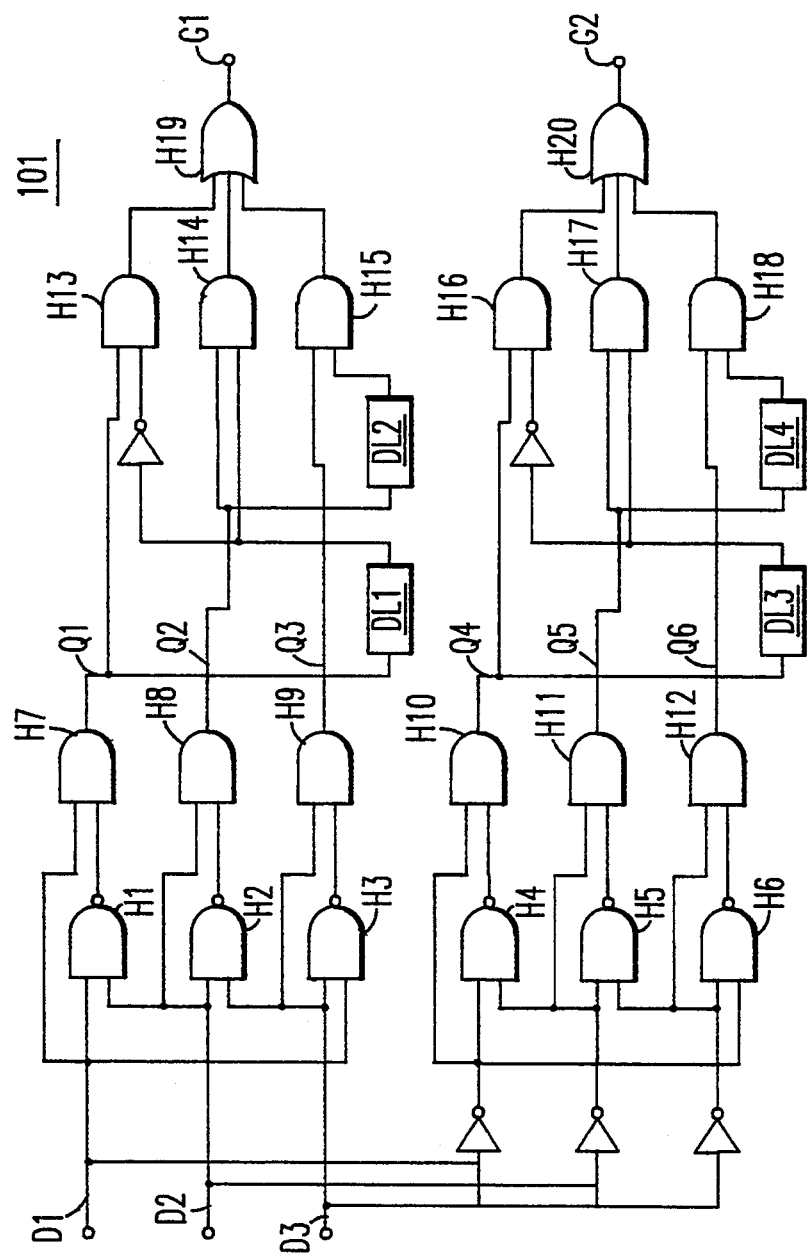

FIG. 2 is a circuit diagram showing the structure of the 120° trigger output circuit 101. The 120° trigger output circuit 101 has NAND gates H1–H6, AND gates H7–H18, OR gates H19 and H20, delay circuits DL1–DL4 and five inverters. The position detection signal D1 inputted to the 120° trigger output circuit 101 is applied to one input ends of the gates H1, H3 and H7. The position detection signal D2 is applied to one input ends of the gates H1, H2 and H8. The position detection signal D3 is applied to one input ends of the gates H2, H3 and H9. Outputs of the gates H1, H2 and H3 are applied to the other input ends of the gates H7, H8 and H9, respectively. The gates H7, H8 and H9 output signals Q1, Q2 and Q3, respectively.

Figure 3:
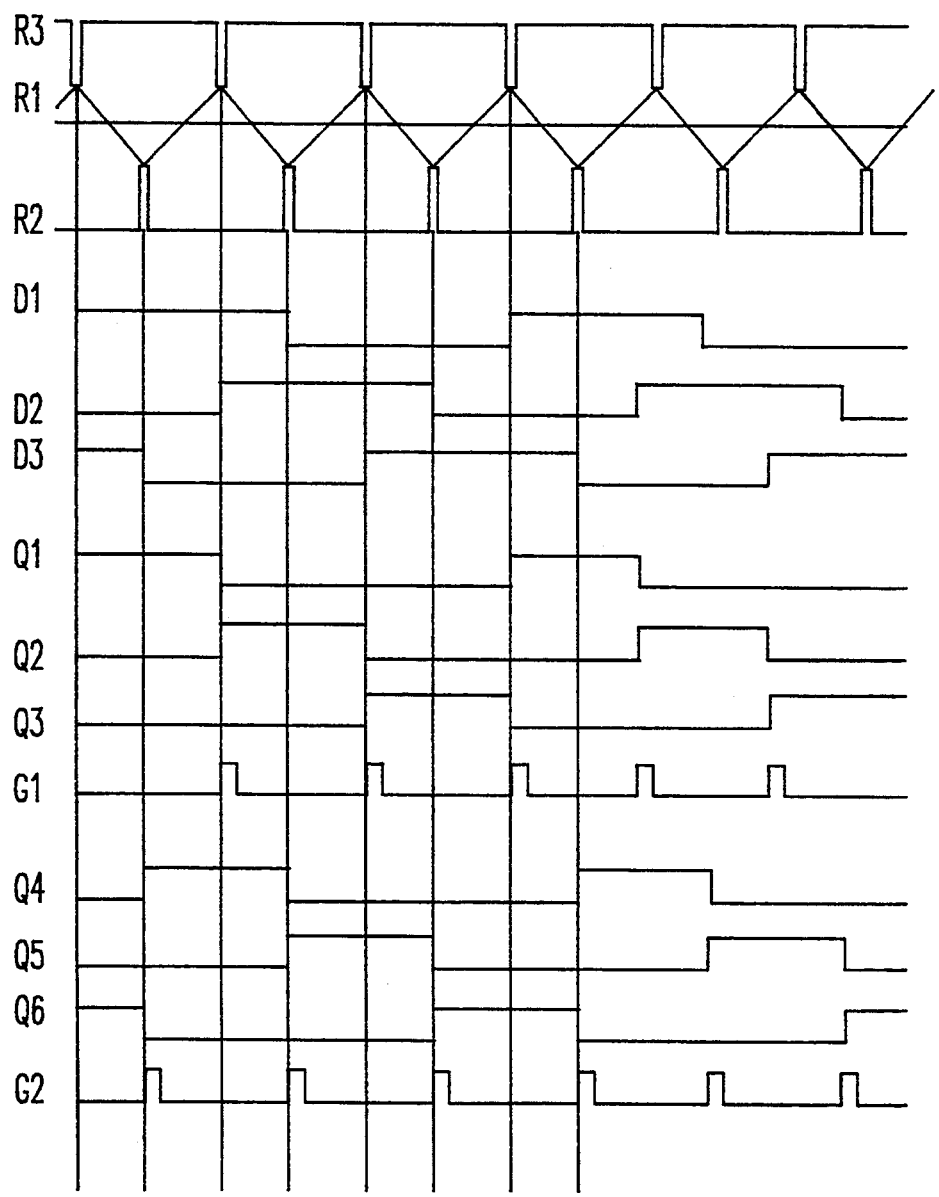
FIG. 3 is a timing chart illustrating the operation of the first preferred embodiment of the present invention.

FIG. 3 is a timing chart showing waveforms of the position detection signals D1–D3, the first and second trigger signals G1 and G2, and the signals Q1, Q2 and Q3. For illustrating the relation of timing, voltages (potentials at the terminals 5A–7A with respect to the terminal 8A) R1–R3 occurring in the coils 51–53 of the motor M are also illustrated.

The signals Q1, Q2 and Q3 are applied to one input ends to the gates H13, H14 and H15, respectively. The signal Q1 is delayed in the delay circuit DL1 and then applied to the other input end of the gate H14. The signal Q1 which is delayed in the delay circuit DL1 is inverted by the inverter and then applied to the other input end of the gate H13. The signal Q2 is delayed in the delay circuit DL2 and then applied to the other input end of the gate H15. A logical sum of outputs of the gates H13, H14 and H15 is taken in the gate H19, which outputs a first trigger signal G1.

The position detection signals D1–D3 are inverted by the inverters and applied to the gates H4, H5 and H6, respectively. The relation of connections among the gates H4, H5, H6, H10, H11, H12, H16, H17, H18 and H20, and the delay circuits DL3, DL4 is the same as that among the gates H1, H2, H3, H7, H8, H9, H13, H14, H15 and H19, and the delay circuits DL1, DL2. The waveforms of signals Q4, Q5 and Q6 which are outputs of the gates H10, H11 and H12 are also illustrated in FIG. 3. A second trigger signal G2 is outputted from the gate H20.

The first and second trigger signals G1 and G2 thus obtained are in synchronization with the voltages R1–R3 and activated with the cycle of 120° maintaining the angular difference of 60° to each other.

Figure 4:
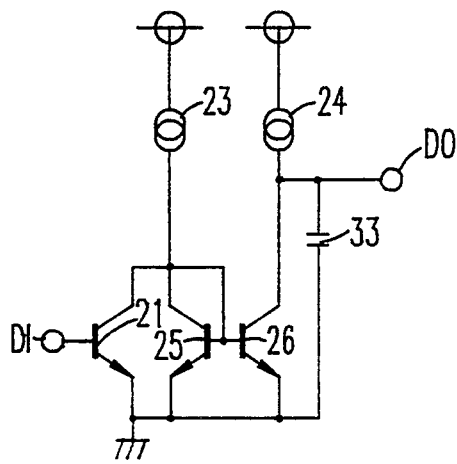
FIGS. 4 and 5 are circuit diagrams illustrating the operation of the first preferred embodiment of the present invention.

FIG. 4 is a circuit diagram illustrating the structure of the delay circuits DL1–DL4. The signal provided to an input end DI is provided to an output end D0 being delayed. Such a delay is made by a current mirror circuit including current sources 23 and 24 and transistors 25 and 26 being controlled by a transistor 21 having its base connected to the input end DI. The potential applied to the output end connected to the capacitor 33 is delayed from the signal applied to the input end DI since charge/discharge of a capacitor 33 which is supplied with current from the current mirror circuit is controlled by a signal provided to the input end DI.

Figure 5:
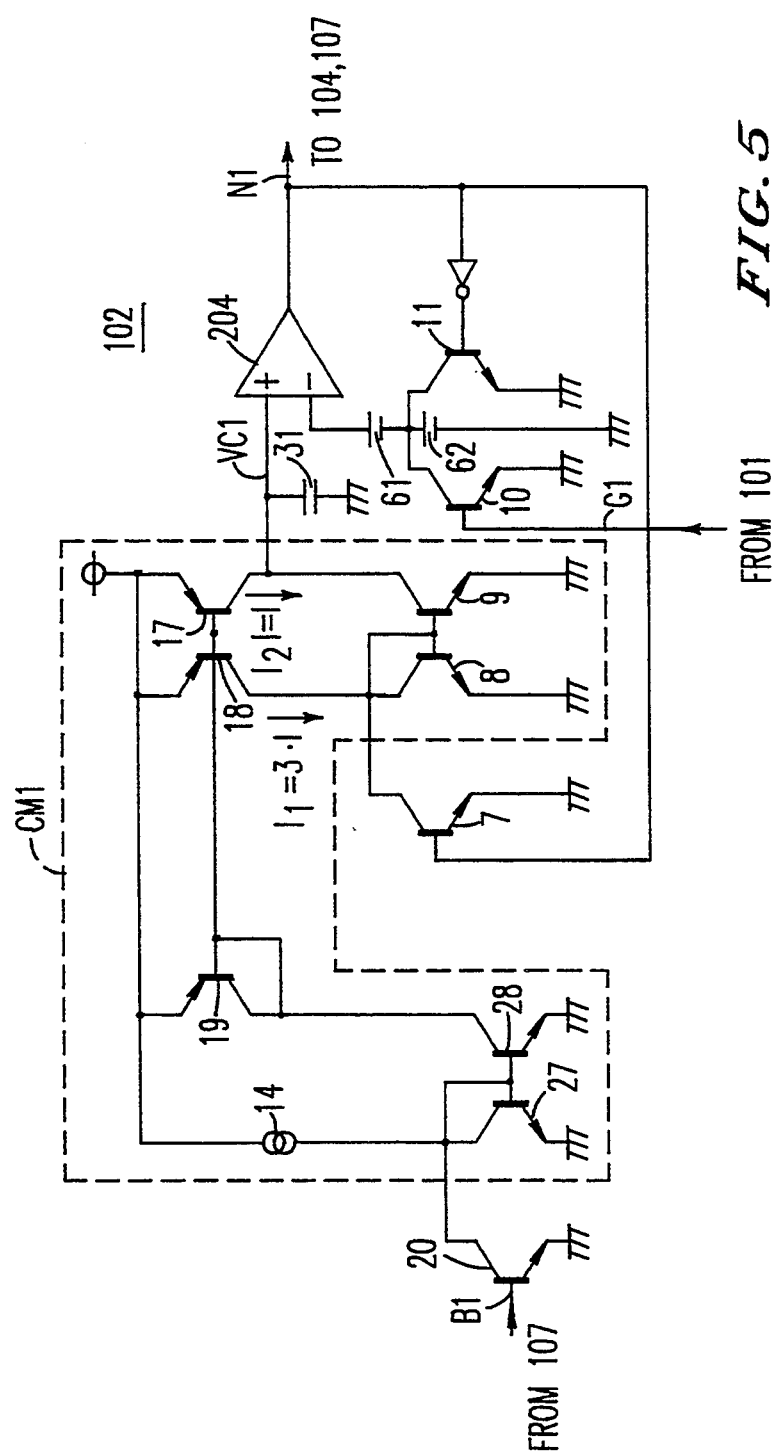

FIG. 5 is a circuit diagram showing the structure of the first oscillation circuit 102. The first oscillation circuit 102 has a comparator 204. A capacitor 31 is connected between an inversion input end of the comparator 204 and ground. Voltage sources 61 and 62 are connected in series between a non-inversion input end of the comparator 204 and ground. The comparator 204 outputs a first oscillation signal N1.

Transistors 10 and 11 are connected in parallel to both ends of the voltage source 62, where the first trigger signal G1 is applied to a base of the transistor 10 from the 120° trigger output circuit 101. Applied to a base of the transistor 11 is a signal which is obtained by inverting the first oscillation signal N1.

A current mirror circuit CM1 is connected to both ends of the capacitance 31. In this current mirror circuit CM1, there are four branches where the pairs of transistors 9 and 17, transistors 8 and 18, transistors 19 and 28 and a current source I4 and a transistor 27 are connected in series, respectively. Currents I1 and I2 flowing to the transistors 18 and 17, respectively, are controlled by the transistors 27, 28, 19 and the current source I4. Note that it is designed so that the current I1 has a current value which is three times that of the current I2.

And a transistor 20 is connected to the transistors 27 and 28, and a transistor 7 is connected to the transistors 8 and 9 in parallel, respectively. A hold signal B1 which will be described later is applied from the hold circuit 107 to a base of the transistor 20. The first oscillation signal N1 is applied to the base of the transistor 7. Accordingly, the current mirror circuit CM1 is controlled by the hold signal B1 and the first oscillation signal N1, so that the potential VC1 at the inversion input end of the comparator 204 (i.e., voltage applied on the capacitor 31) is also controlled by both the signals. At first, the effects of both of the signals on the potential VC1 is considered, and then the relation of timing of the hold signal B1 and the first oscillation signal N1 with respect to the rotation of the motor M will be described later.

Now, assume that the hold signal B1 is at "L". If the first oscillation signal N1 is also at "L", the current mirror circuit CM1 is not affected by both the signals B1, N1 and current of a current value 2·I which is a difference between the currents I1 and I2 flows to the capacitor 31, and which is discharged. If the first oscillation signal N1 goes to the "H", however, the current dose not flow to the transistor 9 and the current I2 having the current value I charges the capacitance 31.

Next, if the hold signal B1 goes to "H" with the first oscillation signal N1 staying at the "H", the current mirror circuit CM1 can not supply current to the capacitor 31 and the capacitor 31 is grounded. The hold signal B1 attains "H— only in a certain potential holding period W as will be described later, in which the potential VC1 is held at the ground potential. Accordingly, the potential VC1 periodically changes in the three periods, i.e., the charge period the discharge period which is half of the charge period and the potential holding period W.

Figure 6:
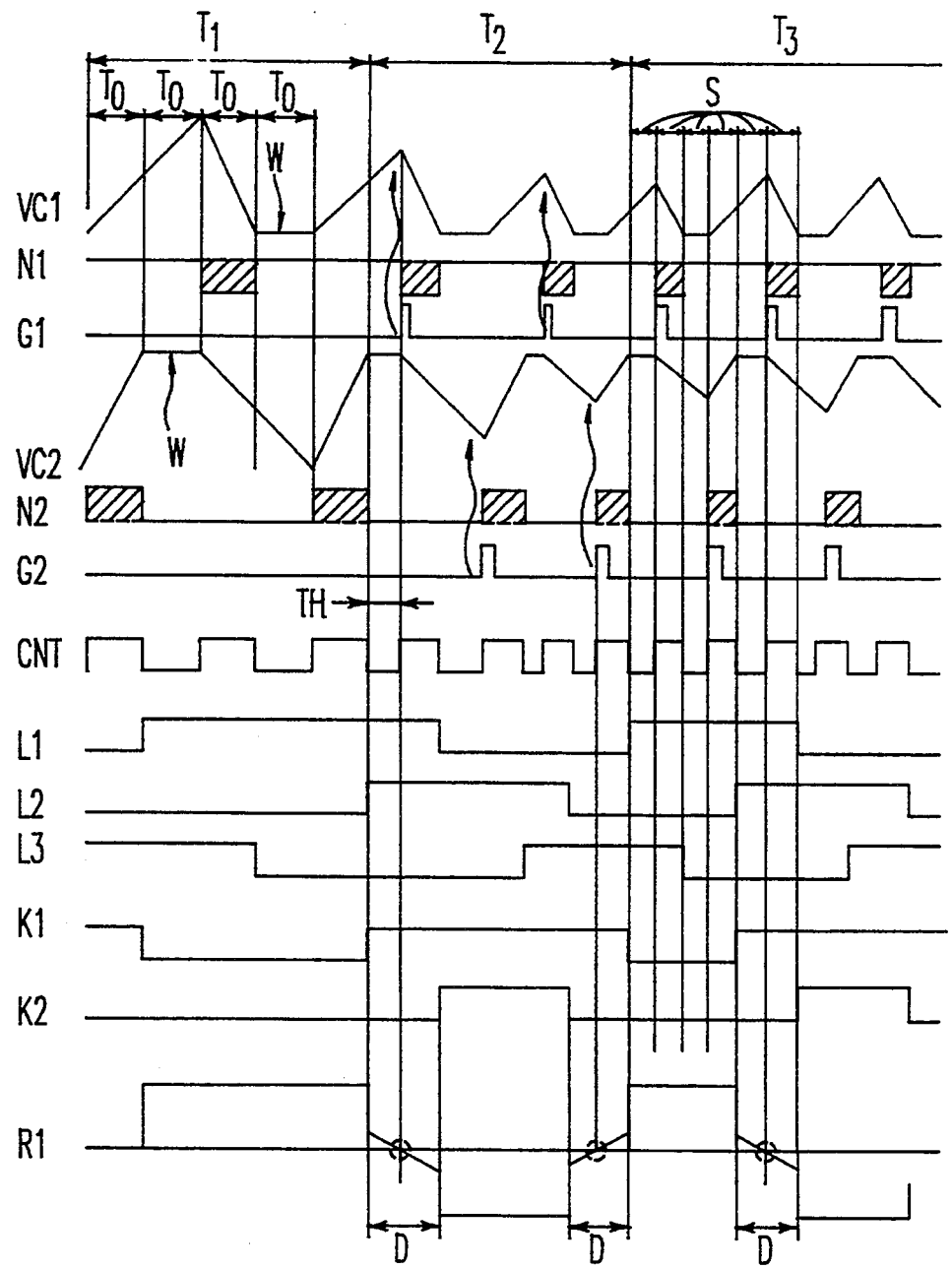
FIG. 6 is a timing chart illustrating the operation of the first preferred embodiment of the present invention.

FIG. 6 is a timing chart showing waveforms of various signals. In the period T1, the motor M is not rotating yet. The lengths of the discharging period and the potential holding period W are To, and the length of the charging period is 2·To.

The period T2 indicates a period in which the motor M starts rotating, where the position detection signals D1–D3 are activated. Accordingly, the first trigger signal G1 is activated as shown in FIG. 6. The potential at the non-inversion input end of the comparator 204 is controlled by the transistor 10 having its base supplied with the activation of the first trigger signal G1. Therefore, when the first trigger signal G1 is activated, the transistor 10 decreases the potential at the non-inversion input end of the comparator 204. Accordingly, with the activation of the first trigger signal G1, the first oscillation signal N1 goes to "L". This state is fed back by the transistor 11 and held. Since the first oscillation signal N1 is applied to the base of the transistor 7, discharge of the capacitor 31 is started with the first oscillation signal N1 going to "L". Then, when the potential VC1 at the non-inversion input end is discharged to decrease to the ground potential, the first oscillation signal N1 attains "H" from the result of comparison between the potential VC1 and the potential at the voltage source 61. Finally, the first oscillation signal N1 goes to "L" in the same period as the discharging period of the capacitor 31.

Subsequently, while the first oscillation signal N1 is staying at "H", the potential holding period W produced by activation of the hold signal B1 which will be described later passes, and charge of the capacitor 31 is started since the first oscillation signal N1 is at "H". In this way, activation/inactivation of the first oscillation signal N1 is controlled.

Figure 7:
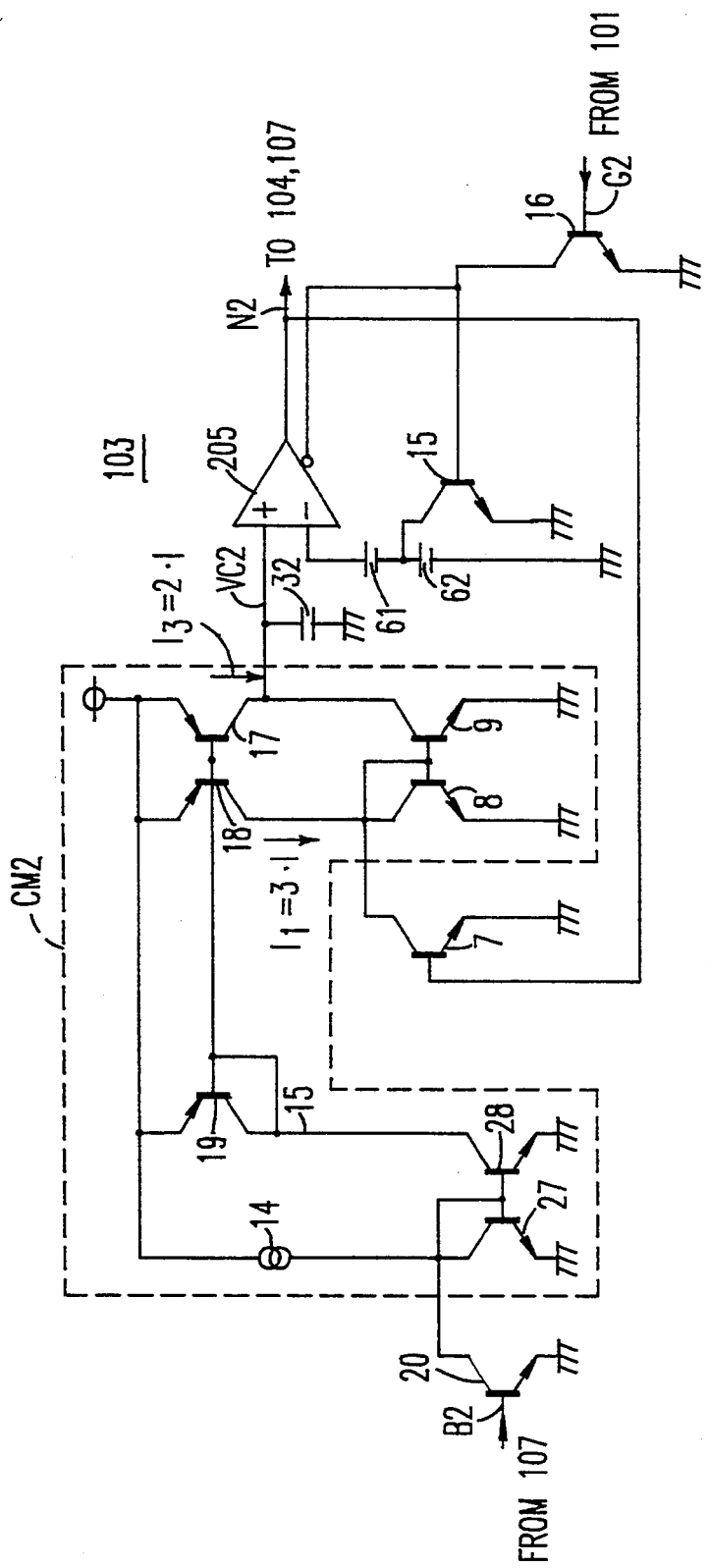
Figure 10:
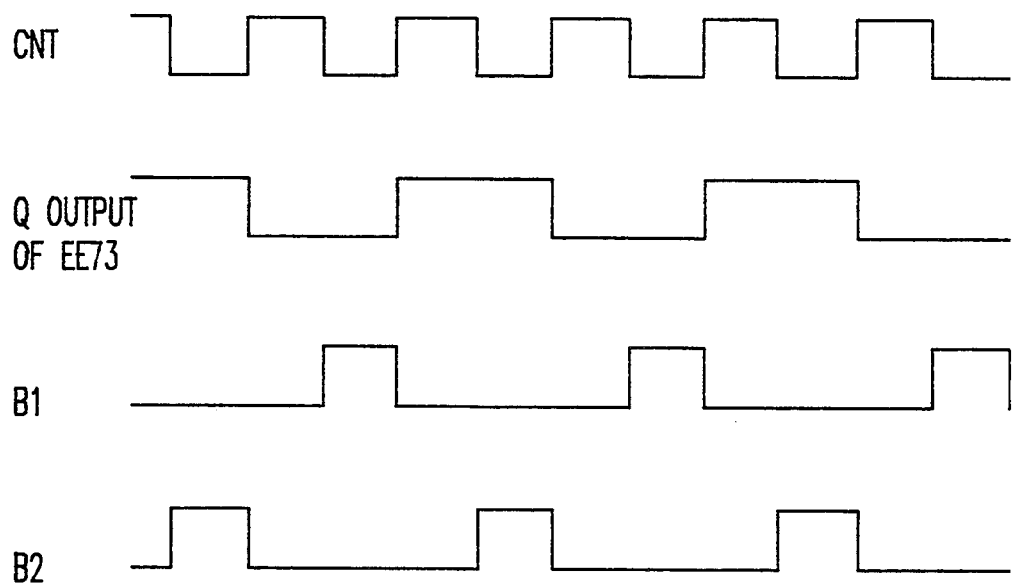
FIG. 10 is a timing chart illustrating the operation of the first preferred embodiment of the present invention.

Activation/inactivation of the second oscillation signal N2 is controlled similarly. FIG. 7 is a circuit diagram illustrating the structure of the second oscillation circuit 103. The second oscillation circuit 103 includes a comparator 205, and a capacitor 32 is connected between its inversion input end and ground. Also, voltage sources 61 and 62 are connected in series between its non-inversion input end and ground, and a non-inversion output end of the comparator 205 outputs the second oscillation signal N2.

A transistor 15 is connected to both ends of the voltage source 62, and a signal obtained by inverting the second oscillation signal N2 is applied to its base from the inversion output end of the comparator 205. Furthermore, the collector of the transistor 16 is connected to the base of the transistor 15. The second trigger signal G2 from the 120° trigger output circuit 101 is applied to the base of the transistor 16. The emitter of the transistor 16 is grounded.

A current mirror circuit CM2 is connected to both ends of the capacitor 32. This current mirror circuit CM2 has the same structure as the current mirror circuit CM1 included in the first oscillation circuit 102 except the current value flowing to the transistor 17. That is to say, the current I3 (the current value 2·I) with a current value which is ⅔ of the current I1 (the current value 3·I) flowing to the transistor 18 flows to the transistor 17. Accordingly, the capacitor 32 is charged by the current I3 of the current value 2·I, and is discharged by the current (the current value I) which is a difference between the current I1 and the current I3.

As the emitter of the transistor 16 is grounded, the potential at the base of the transistor 15 is forced to decrease regardless of the value of the second oscillation signal N2 when the second trigger signal G2 is activated, and the transistor 15 turns off. Thus, the second oscillation signal N2 attains "H" as a result of the comparison at the comparator 205. The base potential of the transistor 15 goes to "L", and this state is held.

When the second oscillation signal N2 attains "H", however, the transistor 7 turns on, and the potential VC2 at the non-inversion input end of the comparator 205 (i.e., voltage applied on the capacitor 32) increases. The second oscillation signal N2 soon goes to "L" and then the potential holding period W passes, and the capacitor 32 is discharged. The activation/inactivation of the second oscillation signal N2 is controlled in this way.

Figure 8:
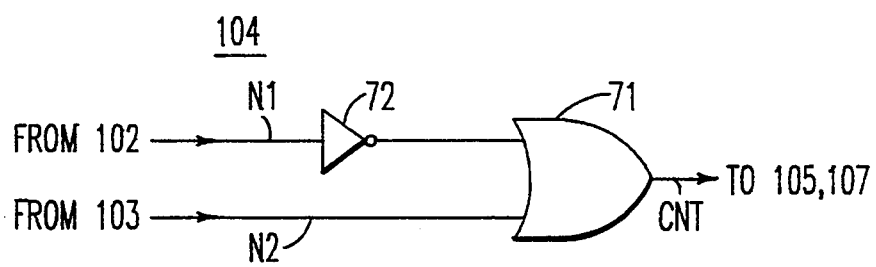
FIGS. 7, 8 and 9 are circuit diagrams illustrating the first preferred embodiment of the present invention.

The control signal CNT is produced from the first and second oscillation signals N1 and N2 produced as described above. FIG. 8 is a circuit diagram showing the structure of the 30° signal operation circuit 104. The first oscillation signal N1 obtained from the first oscillation circuit 102 is inverted by an inverter 72 and applied to one of input ends of an OR gate 71. The second oscillation signal N2 obtained from the second oscillation circuit 103 is applied to the other one of the input ends of the gate 71. The control signal CNT is then outputted from the gate 71. The waveform of the control signal CNT is also shown in FIG. 6.

Figure 9:
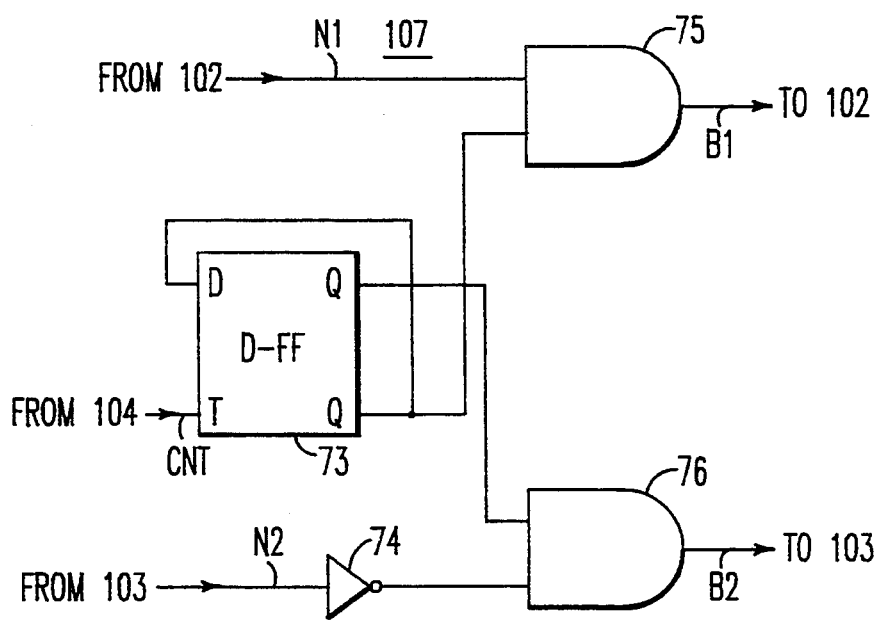

FIG. 9 is a circuit diagram showing the structure of the hold circuit 107. The control signal CNT is applied from the 30° signal operation circuit 104 to a T-input end of the D flip-flop 73, to which D-input end an inversion output end of itself is connected. The first oscillation signal N1 is applied from the first oscillation circuit 102 to one of input ends of an AND gate 75, and the second oscillation signal N2 is inverted and applied to one of input ends of an AND gate 75 from the second oscillation circuit 103. The other input end of the gate 75 is connected to the inversion output end of the D flip-flop 73 and the other input end of the gate 76 is connected to a non-inversion output end of the D flip-flop 73, respectively. The hold signals B1 and B2 are outputted from the gates 75 and 75, respectively. FIG.

10 is a timing chart showing the waveforms of signals in respective parts in FIG. 9.

As can be seen from FIG. 9, the hold signal B1 attains "H" only when the first oscillation signal N1 is at "H". Accordingly, there is no potential holding period W existing in the discharging period of the capacitor 31 in which the first oscillation signal N1 is at "L" as shown in FIG. 6. In the potential holding period W, the capacitor 31 is not charged, and the first oscillation signal N1 goes to "L" after the charging, so that the potential holding period W exists after the discharging period is finished. Therefore, in the period T2 in which the motor M starts moving, the potential VC1 is periodically charged, discharged and potential-held in this order similarly to the period T1.

As described above, the control signal CNT can be obtained as a serial signal which is repeatedly activated and inactivated for every 30° while being in synchronization with the position detection signals D1-D3 by feed back.

Figure 11:
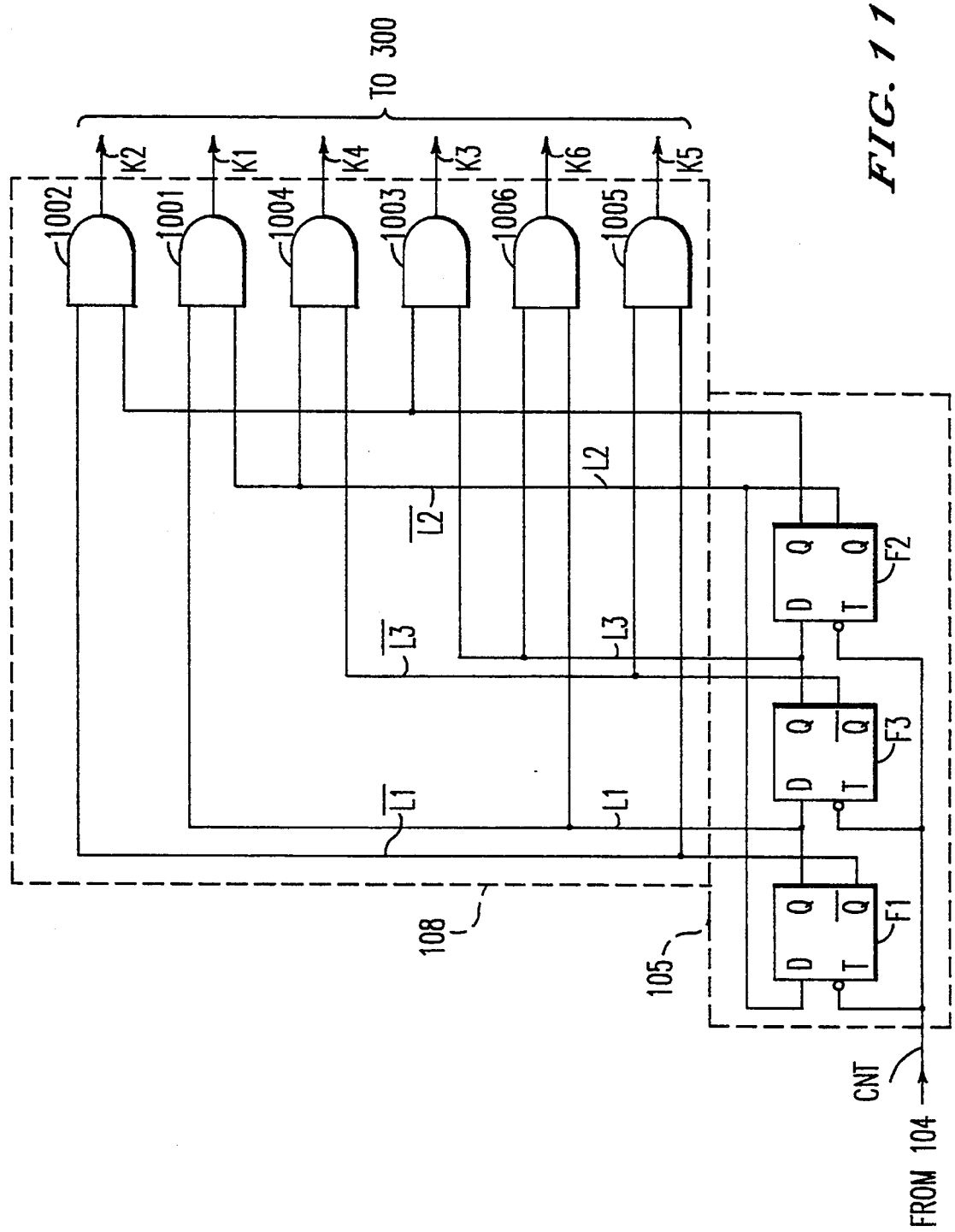
FIG. 11 is a circuit diagram illustrating the first preferred embodiment of the present invention.

FIG. 11 is a circuit diagram showing the structure of the 180° signal conversion circuit 105 and the 120° switching circuit 108. The 180° signal conversion circuit 105 serial/parallel converts the serial control signal CNT into three sets of conversion control signals (L1, $\overline{L1}$), (L2, $\overline{L2}$) and (L3, $\overline{L3}$). These signals repeat activation and inactivation for every 180°. Also the 120° switching circuit 108 converts these conversion control signals L1-L3 and $\overline{L1}$-$\overline{L3}$ into three sets of driving signals (K1, K2), (K3, K4) and (K5, K6). These signals are activated in the length of 120°.

The 180° signal conversion circuit 105 includes three D flip-flops F1-F3. The control signal CNT is inputted to T-input ends of all the flip-flops F1-F3 from the 30° signal operation circuit 104. The non-inversion output end of the flip-flop F1 is connected to the D-input end of the flip-flop F3. The non-inversion output end of the flip-flop F3 is connected to the D-input end of the flip-flop F2. The inversion output end of the flip-flop F2 is connected to the D-input end of the flip-flop F1. By making such connections, the conversion control signals L1-L3 are outputted from the non-inversion output ends of the flip-flops F1-F3, respectively. The conversion control signals $\overline{L1}$-$\overline{L3}$ are outputted from the inversion output ends of the flip-flops F1-F3. respectively.

The timing relation among the control signal CNT and the conversion control signals L1-L3 is also illustrated in FIG. 6. The conversion control signals L1-L3 activate in three cycles of the control signal (one cycle corresponds to the angle of 120°) while maintaining the angular difference of 120° among one another.

The 120° switching circuit 108 includes six AND gates 1001-1006, where the driving signals K1-K6 are outputted from these gates, respectively. The pairs of the inversion control signals (L1, $\overline{L2}$), ($\overline{L1}$, L2), (L2, L3), (L2, $\overline{L3}$), ($\overline{L3}$, $\overline{L1}$), and (L3, L1) are inputted to the gates 1001-1006.

The waveforms of the driving signals K1 and K2 are also illustrated in FIG. 6. The driving signal K1 drives the transistor 1 which is of the PNP-type in the current control potion 300, so that activation/inactivation correspond to "L" and "H", respectively. The driving signal K2 drives the transistor 4 which is of the NPN-type in the current control portion 300, and its activation/inactivation correspond to "H" and "L", respectively. As shown in FIG. 6, the driving signals K1 and K2 are not simultaneously activated, and the period of activation is 120°. The angular difference of the both is held to be 180°.

Figure 21:
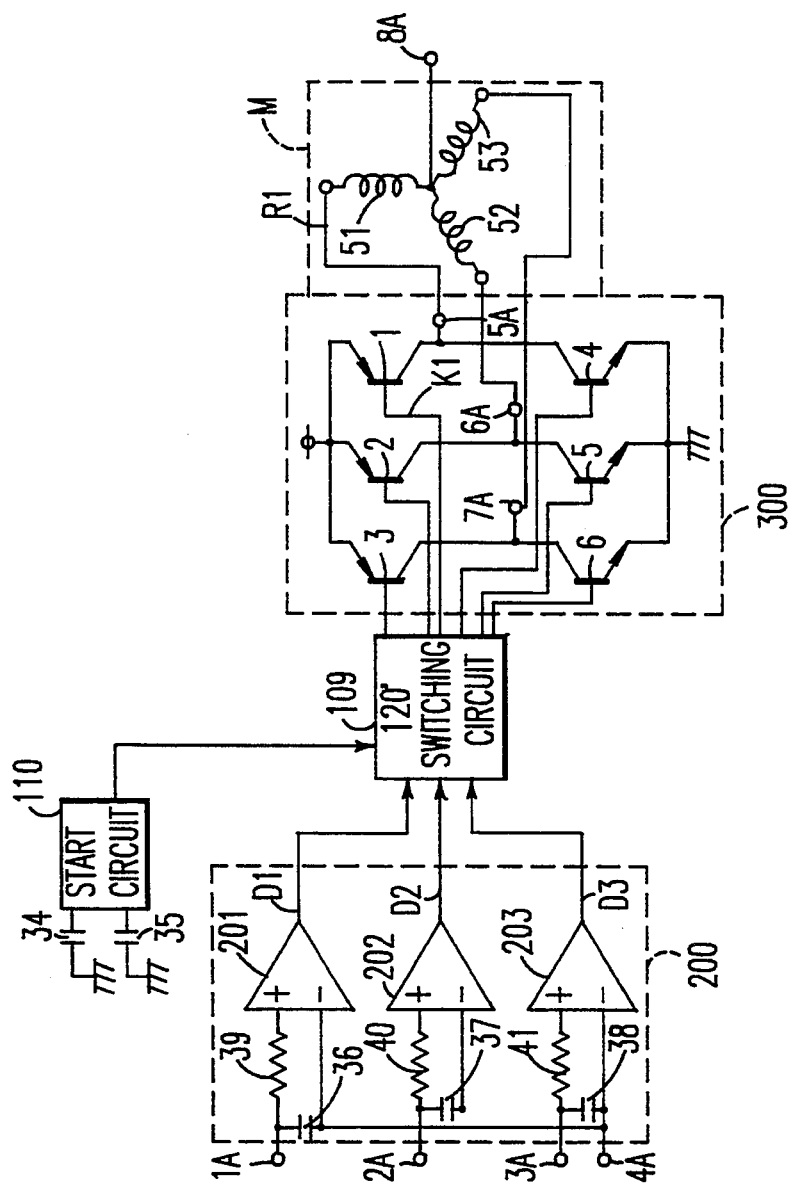
FIG. 21 is a circuit diagram illustrating the conventional art.
Figure 22:
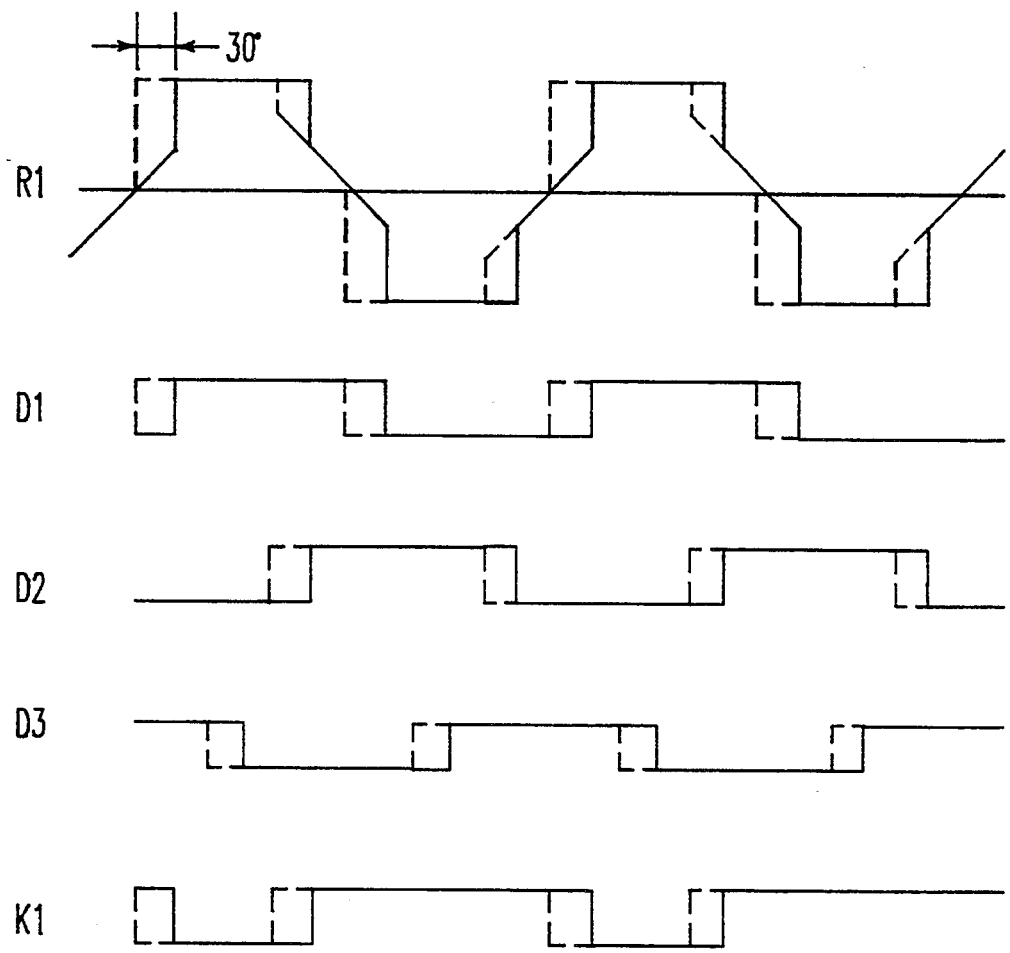
FIG. 22 is a timing chart illustrating the operation of the conventional art.

Referring to FIG. 1 and FIG. 6 again, the operation of the motor driving circuit according to this preferred embodiment will be described. In the present invention, it is the same as the conventional art illustrated in FIG. 21 and FIG. 22 in that the counterelectromotive force occurring in the coils 51-53 of the motor M is detected and the position detection signals D1-D3 are used. Accordingly, the terminals 5A-8A are connected to the terminals 1A-4A, respectively.

In the period in which the motor M has not started rotating yet, the counterelectromotive force is not caused in the coil 51. The control signal CNT is activated/inactivated every 30°, and the first and second oscillation signals N1 and N2 are activated with the cycle of 120° as has been described in the description about the structure of the first and second oscillation circuits 102 and 103 and the hold circuit 107, where the length To of the period corresponds to the angle of 30°. The signal K1 becomes "L" to turn on the transistor 1 to flow current to the coil 51. The high voltage is applied to the coil 51 in the period in which the transistor 1 is on, and the voltage R1 is saturated at a high value.

Subsequently, the motor M starts rotating, where the starting period until it achieves a predetermined number of rotation is the period T2. By the rotation of the motor M, the counterelectromotive force is caused in the coil 51 and the period D takes place in which the voltage R1 gradually decreases. The zero-cross point of the counterelectromotive force, that is, the point at which the voltage R1 becomes zero is converted into the position detection signal D1 by the comparator 201 in the position detection portion 200, which further causes the activation of the first trigger signal G1 by the 120° trigger output circuit 101. Now, the first oscillation signal N1 fails and the potential VC1 starts discharging.

The driving signal K2 is activated being delayed from the rise of the first trigger signal G1 by 30°. This causes the transistor 4 in the current control portion 300 to flow current to the coil 51 in the opposite direction to the transistor 1. Accordingly, the voltage R1 is saturated at a low value. The driving signal K2 is inactivated when the motor M rotates for 120°, and the period D starts and the counterelectromotive force occurring in the coil 51 appears in the voltage R1.

As the number of rotation of the motor M increases, the pulse width of the control signal CNT is shortened in time, but it is constantly 30° in angle of rotation. Therefore, the motor M is driven by the driving signals K1-K3 which are always delayed by 30° from the zero-cross point of the counterelectromotive force.

The period T3 is a period in which the number of rotation of the motor M becomes constant by the servo control (not shown in the figure). In that period, the motor M is also driven by the driving signals K1-K3 which are always delayed by 30° from the zero-cross points of the counterelectromotive force. Also, the periods of 30° become equal in time with the length of S.

As can be seen from the state of driving of the motor M in the period T2, the number of rotation of the motor M in the period T3 dose not affect the way of driving the motor M. This is because the driving signals K1-K3 are activated maintaining the difference of angle of 30° with respect to the zero-cross points of the counterelectromotive force of the coils 51-53 because the control signal CNT repeats activation/inactivation for every 30° in synchronization with the rotation (the zero-cross point of the counterelectromotive force of the coils 51–53) of the motor M and on the basis of which the driving signals K1-K3 are produced.

B. The Second Preferred Embodiment

In the first preferred embodiment, the first and second oscillation circuits 101 and 102 control the rotation of the motor M not only in the period T3 but also in the period T2. The period in which the first and second oscillation signals N1 and N2 are activated is determined by discharge of the capacitances 31 and 32 and there is an upper limit in the electric charge which the capacitances 31 and 32 can charge, therefore its charging time also has an upper limit. Accordingly, the motor M can not be started at a frequency lower than the frequency which corresponds to the discharging time of these capacitances. In other words, defective starting may not be avoided when the motor M starts rotating very slowly.

In the second preferred embodiment, the first preferred embodiment is improved in view of this point, where the fact that the control signal CNT is a serial signal is utilized.

Figure 12:
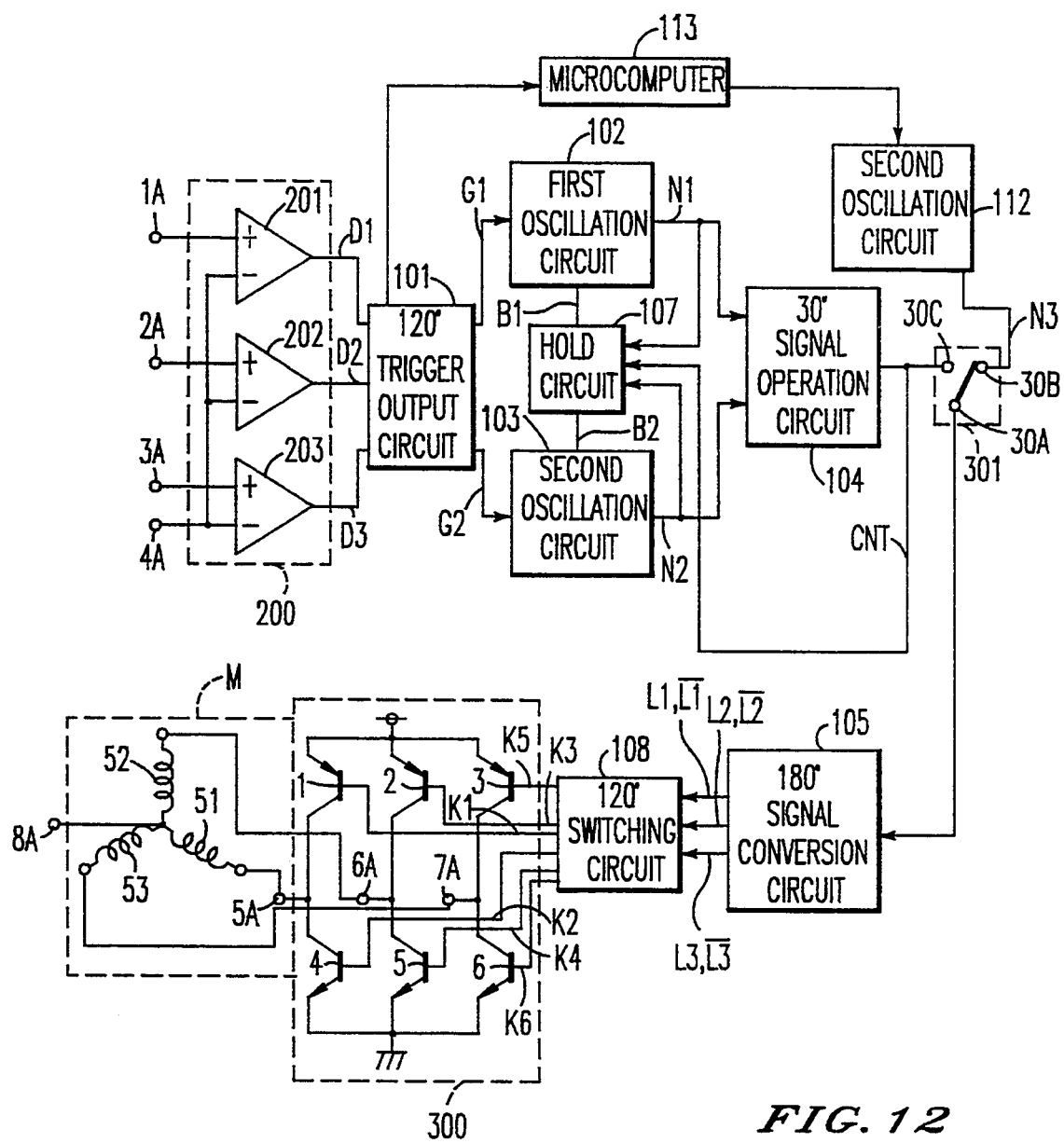
FIG. 12 is a circuit diagram illustrating the second preferred embodiment of a the present invention.

FIG. 12 is a circuit diagram of a DC brushless motor driving circuit according to the second preferred embodiment of the present invention. It is different from the first preferred embodiment shown in FIG. 1 in that the control signal CNT is applied to the 180° signal converting circuit 105 through a switch 301. Furthermore, it is different in that a third oscillation signal N3 which is obtained from a third oscillation circuit 112 is applied to the 180° signal conversion circuit 105 in place of the control signal with the switch 301 being switched. A microcomputer 113 is provided between the 120° trigger output circuit 101 and the third oscillation circuit 112, the switch 301 for control of the third oscillation circuit 112 and the switch 301. In other words, the third oscillation circuit 112 serves as an oscillation circuit for interface of the microcomputer 113.

The switch 301 is subject to control by the microcomputer 113 to apply the third oscillation signal N3 to the 180° signal conversion circuit 105 in the period T1 in which the motor M is not rotating. The microcomputer 113 detects that the motor M is not rotating through the 120° trigger output circuit 101 and controls connection of the switch 301. Specifically, it connects a common terminal 30A to a terminal 30B connected to the third oscillation circuit 112 in terminals of the switch 301.

The third oscillation signal N3 is a serial signal with a frequency lower enough to avoid the defective starting of the motor M. It is easy to set the frequency of the third oscillation signal N3 in that way under control by the microcomputer 113 in the third oscillation circuit 112. Both the activation/inactivation of the third oscillation signal N3 correspond to 30° in the angle of rotation. Therefore, as in the first preferred embodiment, the driving signals K1-K6 are applied to the current control portion 300 in synchronization with the same and the motor starts rotating.

When the motor M thus starts rotating, the microcomputer 113 detects it through the 120° trigger output circuit 101 to switch the switch 301. Specifically, it connects the common terminal 30A of the terminals of the switch 301 to a terminal 30C connected to the 30° signal operation circuit 104. Then, the control signal CNT is applied to the 180° signal conversion circuit 105, which is followed by the same operations as the first preferred embodiment.

C. The Third Preferred Embodiment

If the activation/inactivation of the driving signals K1-K6 are made sharply, the counterelectromotive force of the coils 51-53 becomes large momentarily to cause undesired spike in the voltages R1-R3, for example. The third preferred embodiment is made to avoid it.

Figure 13:
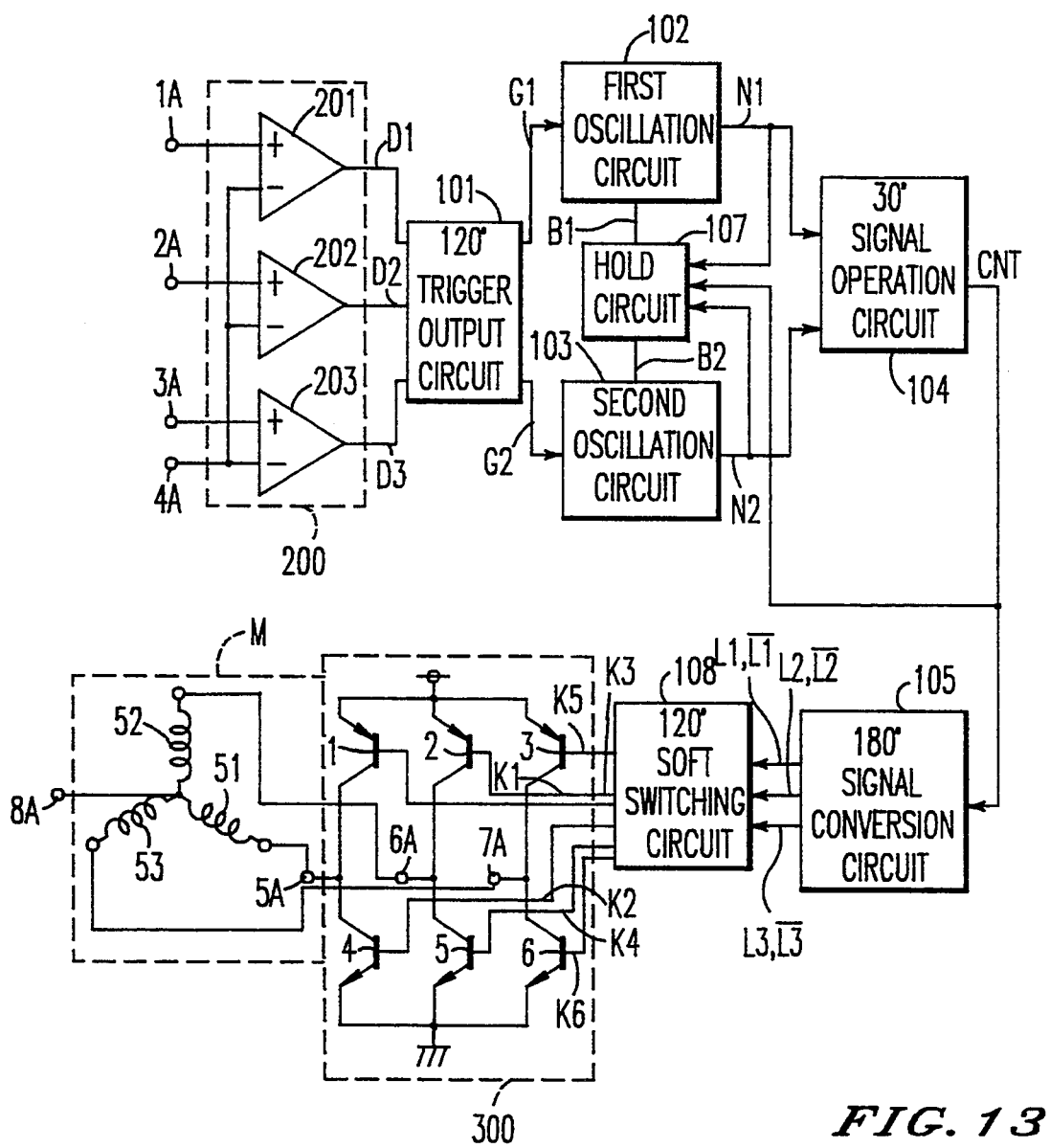
FIGS. 13, 14 and 15 are circuit diagrams illustrating the third preferred embodiment of the present invention.

FIG. 13 is a circuit diagram of a DC brushless motor driving circuit according to the third preferred embodiment of the present invention. It is different only in that the 120° switching circuit 108 in the first preferred embodiment shown in FIG. 1 is replaced by a 120° soft switching circuit 106.

Figure 14:
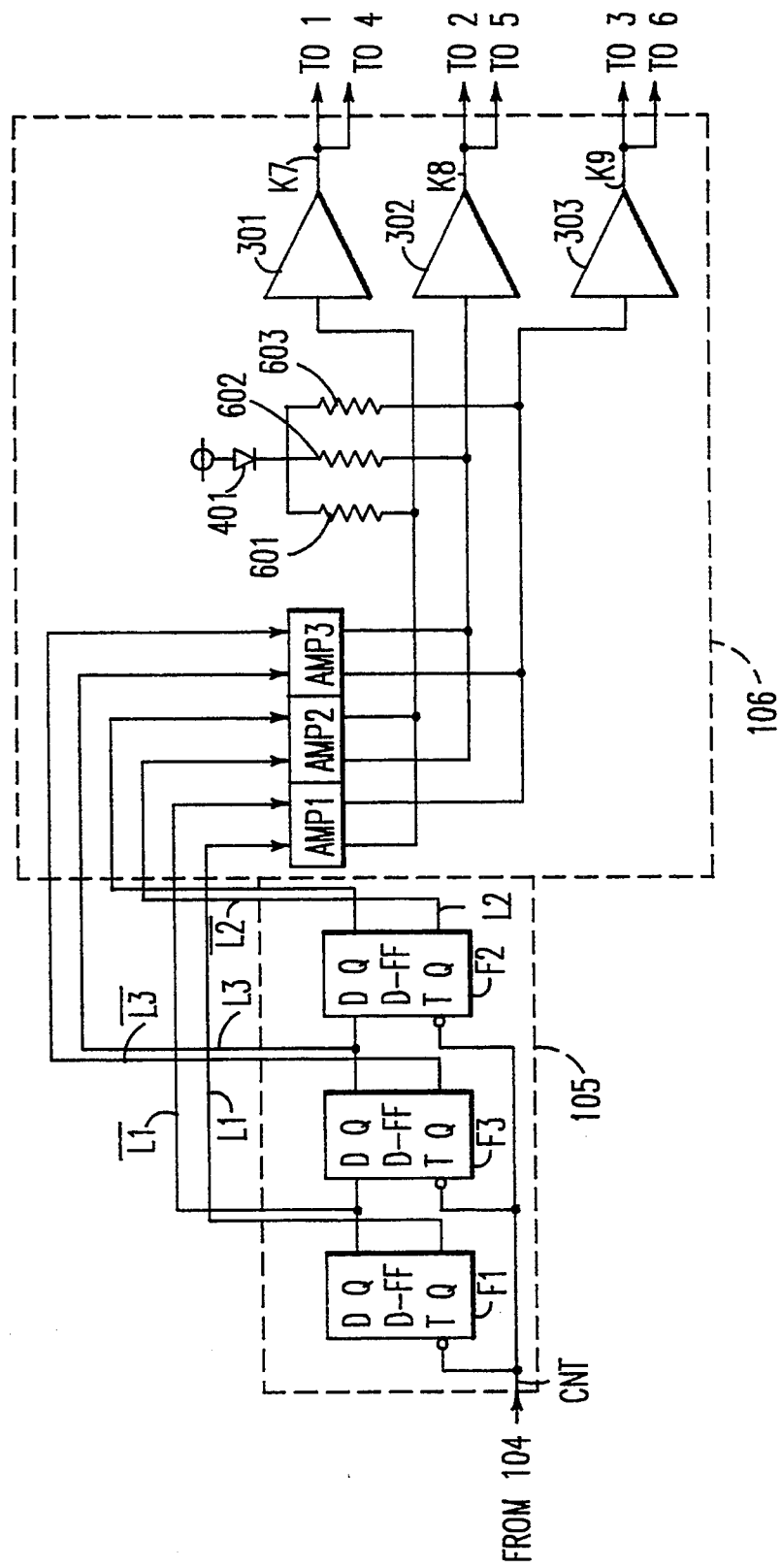

FIG. 14 is a circuit diagram showing the structure of the 120° soft switching circuit 106 and relation of connection between the 180° signal conversion circuit 105 and the same. The 120° soft switching circuit 106 includes differential amplifiers AMP1-AMP3, to which buffers 301-303 are connected. Input ends of the buffers 301-303 are pulled up by a diode 401 and resistors 601-603 to the intermediate potential between a potential corresponding to the logic "H" and a potential corresponding to the logic "L". The buffers 301-303 output three values, i.e., the intermediate potential, the potential corresponding to the logic "H", and the potential corresponding to the logic "L". Its transition is made softly. The buffers 301-303 output the driving signals K7, K8 and K9, respectively. These driving signals K7, K8 and K9 correspond to the pairs of driving signals (K1, K4), (K2, K5) and (K3, K6) in the first preferred embodiment, respectively.

Figure 15:
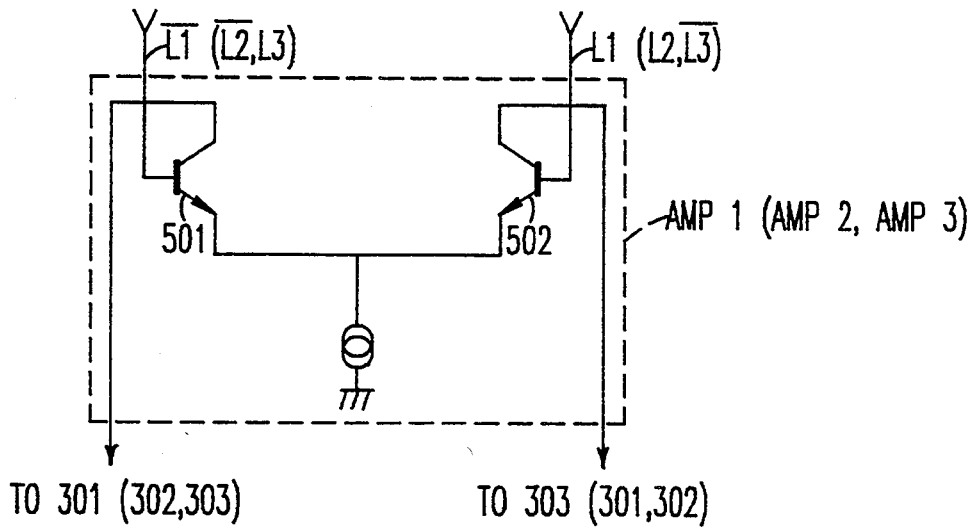

FIG. 15 is a circuit diagram illustrating the internal structure of the differential amplifiers AMP1, AMP2 and AMP3. The differential amplifier AMP1 is connected to the 180° signal conversion circuit 105, and includes transistors 501 an 502 having bases receiving the pair of conversion control signals ($\overline{L1}$, L1), respectively. The emitters of the transistors 501 and 502 are grounded through a current source. Collectors thereof are connected to the buffers 301 and 303, respectively. The differential amplifier AMP2 has the similar structure, where collectors of transistors having bases for receiving the pair of conversion signals ($\overline{L2}$, L2) respectively are connected to the buffers 302 and 301, respectively. The differential amplifier AMP3 also has the similar structure, where the collectors of the transistors having the bases for respectively receiving the pair of conversion control signals (L3, $\overline{L3}$) are connected to the buffers 303 and 302, respectively.

Figure 16:
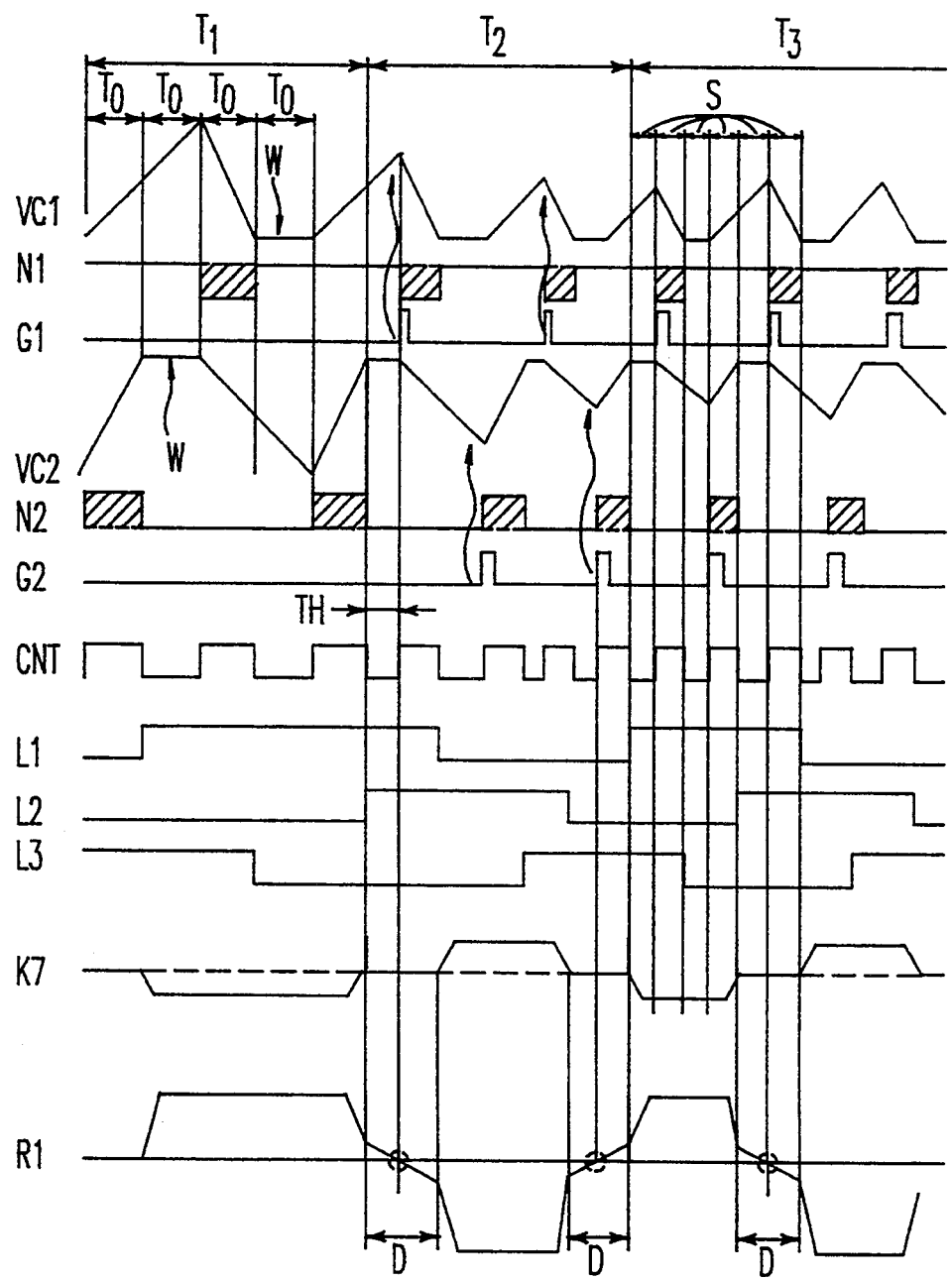
FIG. 16 is a timing chart illustrating the operation of the third preferred embodiment of the present invention.

FIG. 16 is a timing chart corresponding to FIG. 6 showing the operation of the first preferred embodiment. The driving signal K7 is applied to the bases of both the transistors 1 and 4. When the driving signal K7 takes the intermediate potential, both the transistors 1 and 4 turn off, so that both the transistors can be controlled by a single signal. Furthermore, since the signal is processed using the linear area of the differential amplifier, transition of potential is relatively soft. Accordingly, the waveform of the voltage R1 is not steep as shown in FIG. 16, where occurrence of spike is suppressed.

D. The Fourth Preferred Embodiment

In the potential holding periods W, the existence of the potential holding period TH at the first part of the period T2 in which the motor M starts rotating is especially necessary. In the case shown in FIG. 6, this potential holding period TH is a period in which the potential VC2 is held. If there is not this potential holding period TH, activation/inactivation of the control signal CNT may not be made every 30°, and thus the timing chart of driving of the motor M may be shifted thereafter.

Figure 17:
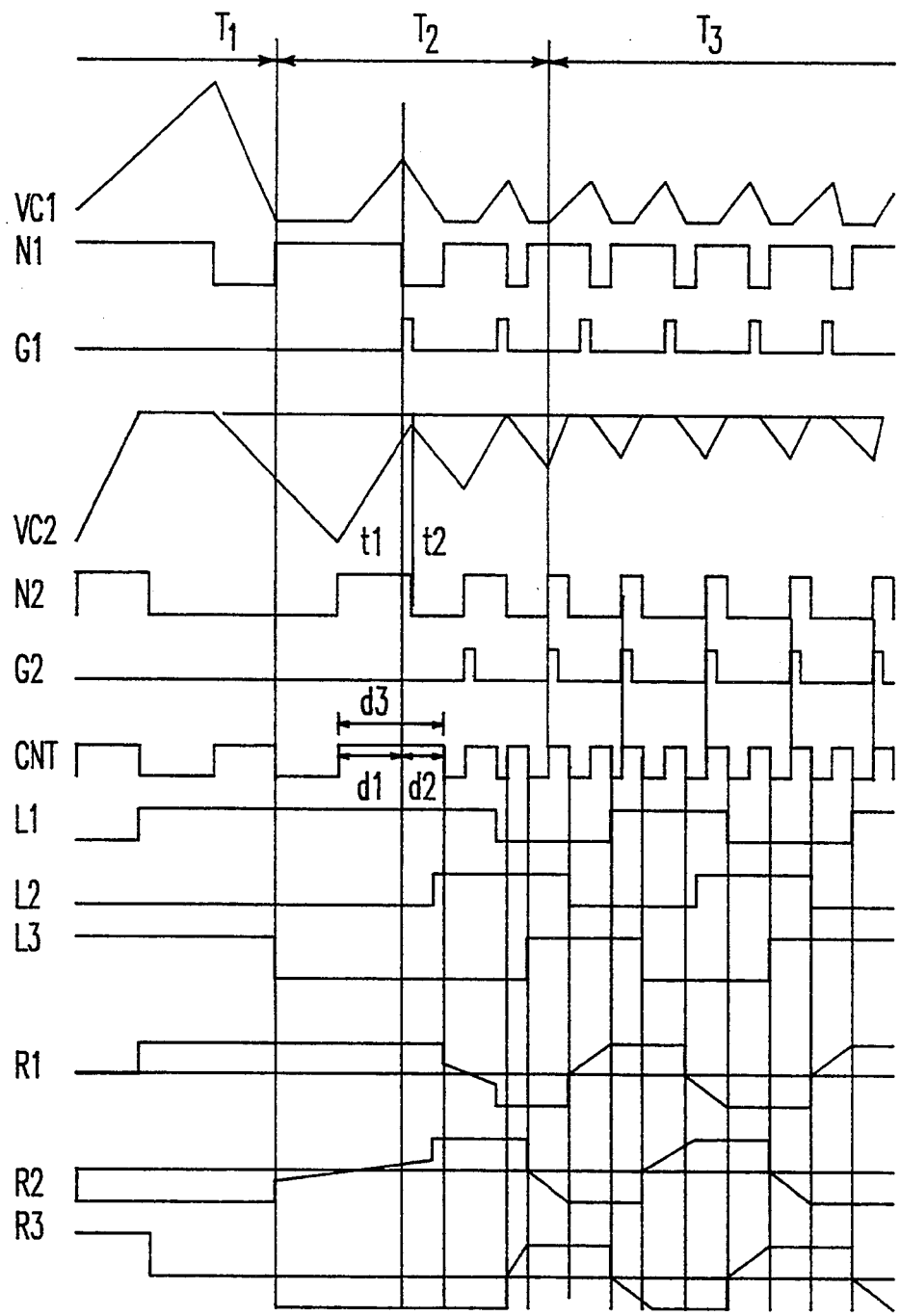
FIG. 17 is a timing chart for describing the fourth preferred embodiment of the present invention.

FIG. 17 is a timing chart which shows such a case. Consider that the first trigger signal G1 is activated at the time t1 at which the second oscillation signal N2 is at "H". The potential VC1 decreases due to the activation of the first trigger signal G1 and the first trigger signal N1 goes to "L". The second oscillation signal N2 is at "H", however, therefore the control signal CNT continuously stays at "H".

In the second oscillation circuit 103, the capacitance 32 is being charged and the potential VC2 increases, and finally the second oscillation signal N2 becomes "L" at the time t2. However, since discharge of the capacitance 31 of the first oscillation circuit 102 is not finished at this time, the first oscillation signal N1 sill stays at "L". Accordingly, even after the time t2, the control signal CNT stays at "H" and discharge of the potential VC2 starts without the potential holding period TH.

That is to say, either of the period d1 in which the control signal CNT is at "H" immediately before the time t1 and the period d2 in which the control signal CNT is at "H" immediately after the time t1 should correspond to 30°, but the period d3 substantially corresponds to 30° because the control signal CNT is "H" in the period d3 which is a combination of the two periods.

Accordingly, the control signal CNT is shifted from the desired angle by 30°, and the conversion control signals L1–L3 based thereon are also shifted from the desired angle by 30°. The waveforms of the voltages R1–R3 occurring in the coils 51–53 are those shown in FIG. 17.

Figure 18:
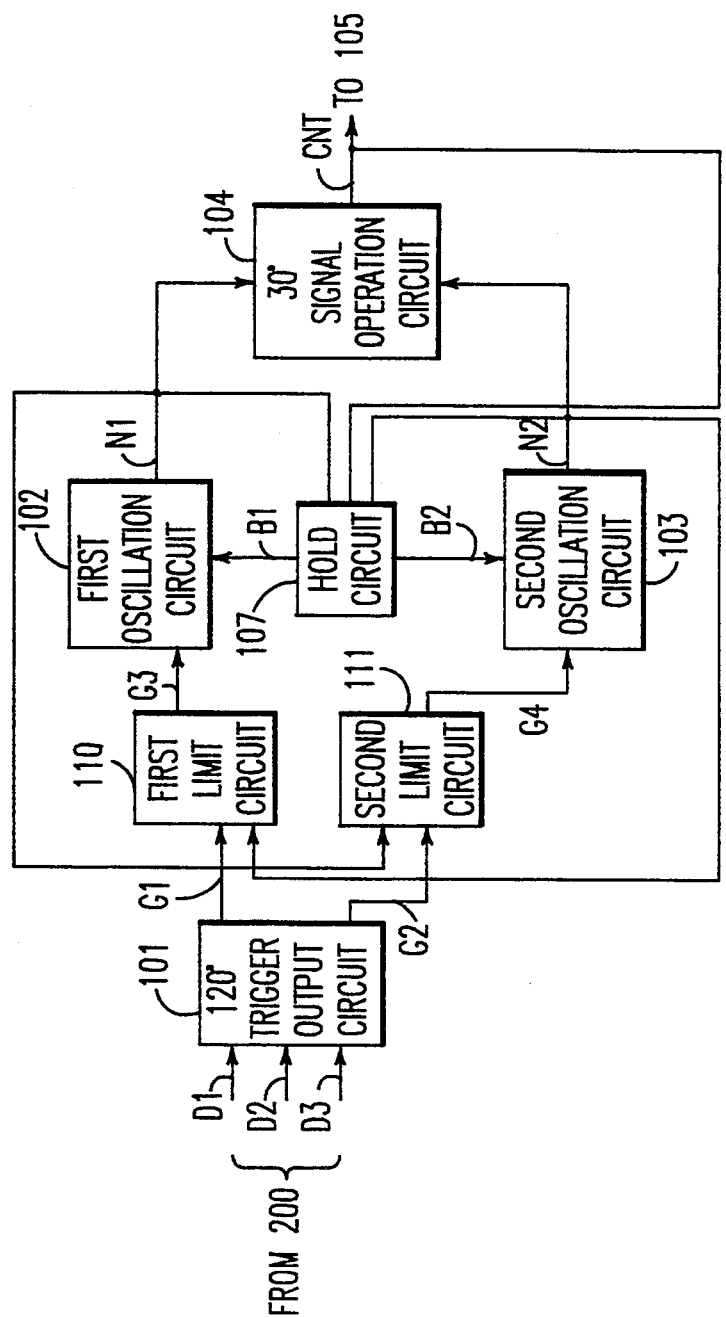

The fourth preferred embodiment is made to avoid such a disadvantage, where the first oscillation signal N1 is not activated when the second oscillation signal N2 is at "H". FIG. 18 is a circuit diagram showing the fourth preferred embodiment in which parts different from the first preferred embodiment and the vicinity thereof only are shown. As in the first preferred embodiment, the 120° trigger signal output circuit 101 receives the detection signals D1–D3 from the position detection portion 200 and outputs the first and second trigger signals G1 and G2. It is different from the first preferred embodiment in that these trigger signals G1 and G2 are not directly provided to the first and second oscillation circuits 102 and 103. The first and second trigger signals G1 and G2 are provided to first and second limit circuits 110 and 111, respectively. The first and second limit circuits 110 and 111 receive the second and first oscillation signals N2 and N1 to output third and fourth trigger signals G3 and G4, respectively. These trigger signals G3 and G4 are then applied to the first and second oscillation circuits 102 and 103. Subsequently, the signal processing the same as the first preferred embodiment are made and the control signal CNT is applied to the 180° signal conversion circuit 105.

Figure 19:
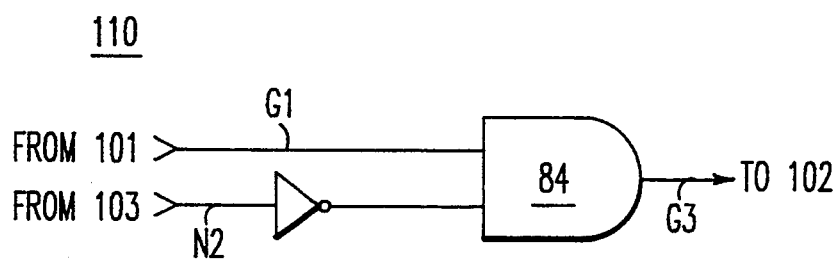
FIGS. 18, 19 and 20 are circuit diagrams illustrating the fourth preferred embodiment of the present invention.
Figure 20:
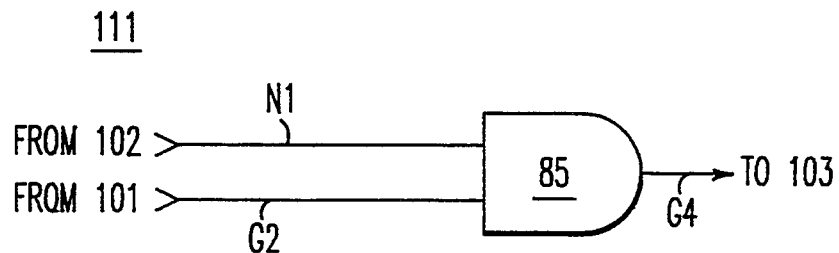

FIG. 19 and FIG. 20 are circuit diagrams showing the structures of the first and second limit circuits 110 and 111, respectively. The first limit circuit 110 includes an inverter and an AND gate 84. In the gate 84, a logical product of the first trigger signal G1 and an inversion of the second oscillation signal N2 is taken to produce the third trigger signal G3. Accordingly, even if the first trigger signal G1 is activated when the second oscillation signal N2 is at "H", the third trigger signal G3 is not activated and the first oscillation signal N1 is not activated, either. Therefore such a problem as described above is not caused.

The second limit circuit 111 includes an AND gate 85. A logical product of the second trigger signal G2 and the first oscillation signal N1 is taken in the gate 85 and the fourth trigger signal G4 is produced. Accordingly, the period in which the fourth trigger signal G4 is activated is limited like the third trigger signal G3, so that such a problem as described above is not caused.

While the invention has been shown and described in detail, the foregoing description is in all aspects illustrative and not restrictive. It is therefore understood that numerous modifications and variations can be devised without departing from the scope of the invention.

We claim:

1. A motor driving circuit for controlling a motor of three-phase having a middle point and first to third input ends, comprising:
    (a) a current control portion having
        (a-1) first to third input ends, and
        (a-2) first to third output ends for supplying first to third driving currents to said first to third input ends of said motor, respectively;
    (b) a detecting portion having
        (b-1) first to third input ends connected to said first to third input ends of said motor,
        (b-2) a fourth input end connected to said middle point, and
        (b-3) an i-th output end for detecting an i-th voltage occurring between said first to third input end of said motor and said middle point to output an i-th detection signal;
    (c) a control signal generating portion having
        (c-1) first to third input ends to which said first to third detection signals are inputted, and
        (c-2) an output end for outputting a control signal serially outputted repeating activation/inactivation for every 30° in synchronization with said first to third detection signals; and
    (d) a driving signal generating portion having
        (d-1) an input end connected to said output end of said control signal generating portion, and
        (d-2) first to third output ends respectively connected to said first to third input ends of said current control portion for respectively outputting first to third driving signals having duty of ⅓ and maintaining a phase difference of 120° to one another in synchronization with said control signal.

2. The motor driving circuit according to claim 1, wherein said driving signal generating portion comprises:
    (d-3) a first control signal conversion portion having
        (d-3-1) an input end to which said control signal is inputted, and
        (d-3-2) first to third output ends for outputting first to third conversion control signals having duty of ½ and maintaining a phase difference of 120° to one another in synchronization with said control signal; and
    (d-4) a second control signal conversion portion having
        (d-4-1) first to third input ends to which said first to third conversion control signals are inputted, and (d-4-2) first to third output ends from which said first to third driving signals are outputted.

3. The motor driving circuit according to claim 2, wherein
said first to third conversion control signals and said first to third output ends of said first control signal conversion portion form pairs, respectively, and
one and the other of said j-th ($1 \leq j \leq 3$) conversion control signal are provided to one and the other of said j-th output end of said first control signal conversion portion, respectively.

4. The motor driving circuit according to claim 3, wherein said first control signal conversion portion further comprises a j-th D flip-flop each having,
(d-3-3) a T-input end to which said control signal is inputted,
(d-3-4) a D-input end,
(d-3-5) a non-inversion output end for outputting one of said j-th conversion control signal, and
(d-3-6) an inversion output end for outputting the other of said j-th conversion control signal, and
said D-input end of said first D flip-flop is connected to said inversion output end of said second D flip-flop, said D-input end of said third D flip-flop is connected to said non-inversion output end of said first D flip-flop, and said D-input end of said second D flip-flop is connected to said non-inversion output end of said third D flip-flop.

5. The motor driving circuit according to claim 3, wherein
said first to third input ends of said current control portion and said first to third output ends of said driving signal generating portion and said first to third driving signals make pairs, respectively, and when one of said pair of j-th ($1 \leq j \leq 3$) driving signal is activated, the other one thereof is inactive.

6. The motor driving circuit according to claim 5, wherein both of said pair of j-th driving signal are inactive continuously in a period of 60°.

7. The motor driving circuit according to claim 6, wherein said second control signal conversion portion further comprises;
(d-4-3) a first gate having
(d-4-3-1) a first input end to which one of said first conversion control signal is provided,
(d-4-3-2) a second input end to which the other of said second conversion control signal is provided, and
(d-4-3-3) an output end for taking a logical product of logics provided to said first and second input ends of itself to output one of said first driving signal;
(d-4-4) a second gate having
(d-4-4-1) a first input end to which the other of said first conversion control signal is provided,
(d-4-4-2) a second input end to which one of said second conversion control signal is provided, and
(d-4-4-3) an output end for taking a logical product of logics provided to said first and second input ends of itself to output the other of said first driving signal;
(d-4-5) a third gate having
(d-4-5-1) a first input end to which one of said second conversion control signal is provided,
(d-4-5-2) a second input end to which one of said third conversion control signal is provided, and
(d-4-5-3) an output end for taking a logical product of logics provided to said first and second input ends of itself to output one of said driving signal;
(d-4-6) a fourth gate having
(d-4-6-1) a first input end to which the other of said second conversion control signal is provided,
(d-4-6-2) a second input end to which the other of said third conversion control signal is provided, and
(d-4-6-3) an output end for taking a logical product of logics provided to said first and second input ends of itself to output the other of said second driving signal;
(d-4-7) a fifth gate having
(d-4-7-1) a first input end to which the other of said third conversion control signal is provided,
(d-4-7-2) a second input end to which the other of said first conversion control signal is provided, and
(d-4-7-3) an output end for taking a logical product of logics provided to said first and second input ends of itself to output one of said third driving signal; and
(d-4-8) a sixth gate having
(d-4-8-1) a first input end to which one of said third conversion control signal is provided,
(d-4-8-2) a second input end to which one of said first conversion control signal is provided, and
(d-4-8-3) an output end for taking a logical product logics provided to said first and second input ends of itself to output the other of said third driving signal.

8. The motor driving circuit according to claim 2, wherein said first to third conversion control signals and said first to third driving signals transit among a plurality of logic values, and the transition of values of said first to third conversion control signals is sharper than the transition of said first to third driving signals.

9. The motor driving circuit according to claim 8, wherein
said first to third conversion control signals and said first to third input ends of said second control signal conversion portion make pairs, respectively, and
one and the other of said j-th ($1 \leq j \leq 3$) conversion control signal are provided to one and the other of said j-th input end of said second control signal conversion portion, respectively.

10. The motor driving circuit according to claim 9, wherein said first to third conversion control signals take two values and said first to third driving signals take three values.

11. The motor driving circuit according to claim 9, wherein said second control signal conversion portion comprises;
(d-5-3) a j-th differential amplifier having
(d-5-3-1) a pair of differential input ends to which pair of said j-th conversion control signal are inputted, respectively, and
(d-5-3-2) first and second output ends for amplifying and outputting one and the other of said pair of j-th conversion control signal using a linear area, respectively;
(d-5-4) a first buffer having
(d-5-4-1) an input end to which said first output end of said first differential amplifier and said second output end of said second differential amplifier are connected in common, and (d-5-4-2) an output end for outputting said first driving signal;

(d-5-5) a second buffer having (d-5-5-1) an input end to which said first output end of said second differential amplifier and said second output end of said third differential amplifier are connected in common, and (d-5-5-2) an output end for outputting said second driving signal;

(d-5-6) a third buffer having (d-5-6-1) an input end to which said first output end of said third differential amplifier and said second output end of said first differential amplifier are connected in common, and (d-5-6-2) an output end for outputting said third driving signal; and (d-5-7) pull-up means for pulling up said input ends of said first to third buffers to predetermined potential.

12. The motor driving circuit according to claim 8, wherein said control signal generating portion comprises;

(c-3) a trigger output circuit having (c-3-1) first to third input ends to which said first to third detection signals are provided, (c-3-2) a first output end to which a first trigger signal which is activated every 120° in synchronization with said first to third detection signals is provided, and (c-3-3) a second output end to which a second trigger signal which is activated maintaining a phase difference of 60° with respect to said first trigger signal is provided;

(c-4) an oscillation signal generating portion having (c-4-1) first and second trigger input ends to which said first and second trigger signals are provided, respectively, and (c-4-2) first and second output ends from which first and second oscillation signals which are activated continuously in a period of 30° for every 120°, and, when either of first and second trigger signals is activated, activated in synchronization with the same, respectively, are outputted; and (c-5) an operation circuit having (c-5-1) first and second input ends to which said first and second oscillation signals are provided, and (c-5-2) an output end for outputting said control signal in synchronization with said first and second oscillation signals.

13. The motor driving circuit according to claim 12, wherein said oscillation signal generating portion comprises;

(c-4-3) a hold circuit having (c-4-3-1) an input end to which said control signal and said first and second oscillation signals are inputted, and (c-4-3-2) an output end for outputting first and second hold signals either of which is activated in a period of 30° and holds an angular difference of 30° to each other;

(c-4-4) a first oscillation circuit for producing said first oscillation signal and holding logic of said first oscillation signal when said first hold signal is activated; and (c-4-5) a second oscillation circuit for producing said second oscillation signal and holding logic of said second oscillation signal when said second hold signal is activated.

14. The motor driving circuit according to claim 13, wherein said first oscillation circuit comprises;

(c-4-4-1) a first reference potential, (c-4-4-2) a first comparator having an inversion input end, a non-inversion input end and an output end for outputting a result of comparison of values provided to said inversion input end and said non-inversion input end of itself as said first oscillation signal, (c-4-4-3) a first capacitance connected between said inversion input end of said first comparator and said first reference potential, (c-4-4-4) a first voltage source connected between said non-inversion input end of said first comparator and said first reference potential for providing lower potential during said first oscillation signal being active than a potential during said first oscillation signal being inactive, and for providing lower potential when said first trigger signal is activated than a potential immediately before that, (c-4-4-5) a first current source for charging/discharging said first capacitance, (c-4-4-6) a first current control means for performing control so that supply of current by said first current source is stopped when said first hold signal is activated, and (c-4-4-7) a second current control means for performing control to said first current source so that said first capacitance is discharged when said first oscillation signal is activated and said first capacitance is charged when said first oscillation signal is inactivated.

15. The motor driving circuit according to claim 14, wherein said second oscillation circuit comprises;

(c-4-5-1) a second reference potential, (c-4-5-2) a second comparator having an inversion input end, a non-inversion input end and an output end for outputting a result of comparison of values provided to said inversion input end and said non-inversion input end of itself as said second oscillation signal, (c-4-5-3) a second capacitance connected between said inversion input end of said second comparator and said second reference potential, (c-4-5-4) a second voltage source connected between said non-inversion input end of said second comparator and said second reference potential for providing higher potential during said second oscillation signal being active than a potential during said second oscillation signal being inactive, and for providing higher potential when said second trigger signal is activated than a potential immediately before that, (c-4-5-5) a second current source for charging/discharging said second capacitance, (c-4-5-6) a third current control means for performing control so that supply of current by said second current source is stopped when said second hold signal is activated, and (c-4-5-7) a fourth current control means for performing control to said second current source so that said second capacitance is discharged when said second oscillation signal is activated and said second capacitance is charged when said second oscillation signal in inactivated.

16. The motor driving circuit according to claim 12, wherein said trigger output circuit further comprises (c-3-4) cut off means for permitting signal cut off control so that said first trigger signal is activated only when said second oscillation signal is inactive, and said second trigger signal is activated only when said first oscillation signal is inactive.

17. The motor driving circuit according to claim 16, wherein said cut off means comprises;
- (c-3-4-2) a first gate having a first input end for inputting said first trigger signal, a second input end for inputting a value of inversion of said second oscillation signal and an output end for outputting a logical product of values provided to said first and second input ends of itself, and
- (c-3-4-3) a second gate having a second input end for inputting said second trigger signal, a second input end for inputting said first oscillation signal and an output end for outputting a logical product of values provided to said first and second input ends of itself.

18. The motor driving circuit according to claim 1, further comprising;
- (e) a third oscillation circuit for outputting a start signal outputted serially repeating activation/inactivation for every 30°,
- (f) a switch having
    - (f-1) a first input end connected to said output end of said control signal generating portion,
    - (f-2) a second input end for inputting said start signal, and
    - (f-3) an output end electrically connected only to one of said first and second input ends of itself; and
- (g) oscillation control means for switching said switch and controlling frequency of said start signal.

* * * * *